(12) United States Patent
Kobayashi et al.

(10) Patent No.: US 10,676,612 B2
(45) Date of Patent: Jun. 9, 2020

(54) POLYCARBONATE RESIN COMPOSITION, HEAT RAY SHIELDING MOLDED BODY AND HEAT RAY SHIELDING LAMINATION BODY

(71) Applicant: SUMITOMO METAL MINING CO., LTD., Tokyo (JP)

(72) Inventors: Hiroshi Kobayashi, Ichikawa (JP); Kenichi Fujita, Ichikawa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 16/073,938

(22) PCT Filed: Oct. 27, 2016

(86) PCT No.: PCT/JP2016/081880
§ 371 (c)(1),
(2) Date: Jul. 30, 2018

(87) PCT Pub. No.: WO2017/130492
PCT Pub. Date: Aug. 3, 2017

(65) Prior Publication Data
US 2019/0040251 A1  Feb. 7, 2019

(30) Foreign Application Priority Data
Jan. 28, 2016 (JP) .................. 2016-014525

(51) Int. Cl.
*C08L 69/00* (2006.01)
*C08K 5/521* (2006.01)
(Continued)

(52) U.S. Cl.
CPC ............... *C08L 69/00* (2013.01); *C08K 3/22* (2013.01); *C08K 5/13* (2013.01); *C08K 5/36* (2013.01);
(Continued)

(58) Field of Classification Search
CPC ...................................................... C08K 3/22
See application file for complete search history.

(56) References Cited

U.S. PATENT DOCUMENTS 5,712,332 A   1/1998   Kaieda et al.
5,910,562 A   6/1999   Miura et al.
(Continued)

FOREIGN PATENT DOCUMENTS

EP   0 320 658 A1   6/1989
EP   3081596 A1    10/2016
(Continued)

OTHER PUBLICATIONS

Aug. 30, 2019 Search Report issued in European Patent Application No. 1688077.1.
(Continued)

*Primary Examiner* — Mark S Kaucher
(74) *Attorney, Agent, or Firm* — Oliff PLC

(57) ABSTRACT

A polycarbonate resin composition capable of suppressing the deterioration of the weather resistance of the infrared shielding material fine particles, including: a composite tungsten oxide fine particle (A), a weather resistance improver (B), and a polycarbonate resin (C), wherein (A) is expressed by a general formula $M_xWO_y$, and (B) is any one of those containing a phosphite compound (B1), or containing the phosphite compound and one or more kinds selected from a hindered phenol-based stabilizer, phosphoric acid-based stabilizer and sulfur-based stabilizer (B2), or containing a hindered phenol-based stabilizer and one or more kinds selected from a phosphoric acid-based stabilizer and sulfur-based stabilizer (B3), and an addition amount of (B) is 0.1 parts by weight or more and 20 parts by weight or less, based on 1 parts by weight of (A), and provides a heat ray shielding molded body and a heat ray shielding lamination body produced using the composition.

7 Claims, 1 Drawing Sheet

(51) Int. Cl.
*C08K 5/524* (2006.01)
*C08K 5/527* (2006.01)
*C08K 5/13* (2006.01)
*C08K 5/36* (2006.01)
*C08K 3/22* (2006.01)

(52) U.S. Cl.
CPC .............. *C08K 5/521* (2013.01); *C08K 5/524* (2013.01); *C08K 5/527* (2013.01); *C08K 2003/2258* (2013.01); *C08K 2201/005* (2013.01); *C08K 2201/011* (2013.01)

(56) References Cited

U.S. PATENT DOCUMENTS

| | | | |
|---|---|---|---|
| 7,666,930 | B2 | 2/2010 | Fujita et al. |
| 8,399,547 | B2 | 3/2013 | Meyer et al. |
| 8,628,699 | B2 | 1/2014 | Meyer et al. |
| 8,845,920 | B2 | 9/2014 | Meyer |
| 9,029,440 | B2 | 5/2015 | Meyer et al. |
| 9,074,071 | B2 | 7/2015 | Fujita |
| 2011/0144250 | A1 | 6/2011 | Meyer et al. |
| 2011/0272646 | A1 | 11/2011 | Meyer |
| 2011/0272647 | A1 | 11/2011 | Meyer et al. |
| 2012/0157587 | A1 | 6/2012 | Meyer et al. |
| 2012/0305863 | A1 | 12/2012 | Togashi et al. |
| 2014/0027686 | A1 | 1/2014 | Togashi et al. |
| 2016/0122533 | A1 | 5/2016 | Tomita et al. |
| 2016/0326365 | A1 | 11/2016 | Sakaki et al. |

FOREIGN PATENT DOCUMENTS

| | | |
|---|---|---|
| JP | H01-245049 A | 9/1989 |
| JP | H02-173060 A | 7/1990 |
| JP | H05-9370 A | 1/1993 |
| JP | H05-78544 A | 3/1993 |
| JP | H06-256541 A | 9/1994 |
| JP | H06-264050 A | 9/1994 |
| JP | H10-219090 A | 8/1998 |
| JP | 2001-181495 A | 7/2001 |
| JP | 2003-327717 A | 11/2003 |
| JP | 2004-59875 A | 2/2004 |
| JP | 2006-282736 A | 10/2006 |
| JP | 2008-24902 A | 2/2008 |
| JP | 2008-150548 A | 7/2008 |
| JP | 2008-156386 A | 7/2008 |
| JP | 2008-208274 A | 9/2008 |
| JP | 2008-214554 A | 9/2008 |
| JP | 2008-214596 A | 9/2008 |
| JP | 2011-168636 A | 9/2011 |
| JP | 4933704 B2 | 5/2012 |
| JP | 2012-251061 A | 12/2012 |
| JP | 2013-064042 A | 4/2013 |
| JP | 2013-513708 A | 4/2013 |
| JP | 2013-526623 A | 6/2013 |
| JP | 2013-526625 A | 6/2013 |
| JP | 2014-506269 A | 3/2014 |
| JP | 2015-180709 A | 10/2015 |
| JP | 2016-169189 A | 9/2016 |
| WO | 2005/087680 A1 | 9/2005 |
| WO | 2010/143732 A1 | 12/2010 |
| WO | 2015/087526 A1 | 6/2015 |

OTHER PUBLICATIONS

Dec. 27, 2016 International Search Report issued in International Patent Application No. PCT/JP2016/081880.
Mar. 23, 2020 Office Action issued in Japanese Patent Application No. 2017-563691.

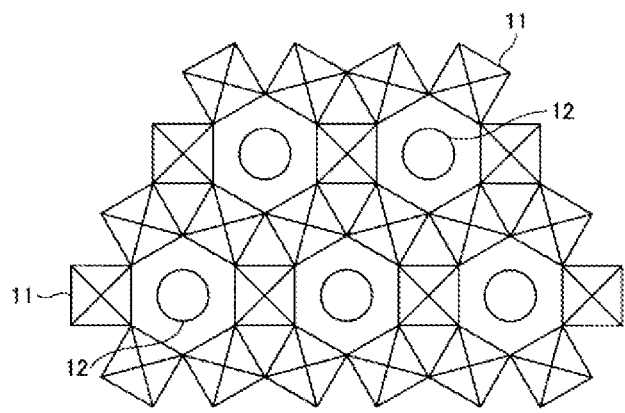

POLYCARBONATE RESIN COMPOSITION, HEAT RAY SHIELDING MOLDED BODY AND HEAT RAY SHIELDING LAMINATION BODY

TECHNICAL FIELD

The present invention relates to a composite tungsten oxide fine particle-dispersed polycarbonate resin composition, a heat ray shielding molded body and a heat ray shielding lamination body.

DESCRIPTION OF RELATED ART

Roofing materials and wall materials of various buildings, transportation equipment such as automobiles, trains, aircraft, etc. are provided with so-called opening portions such as windows, doors and the like. The sunlight incident from these opening portions contains ultraviolet rays and infrared rays other than visible lights. Among these infrared rays, near-infrared rays having a wavelength of 800 to 2500 nm are also called heat rays, and the heat rays enter into an interior of a room, an interior of a vehicle, and an interior of an airplane from the above opening portions, thereby causing a temperature rise in the interior of them.

In order to solve such a temperature rise, in recent years, in the field of manufacturing and construction of window materials of various buildings and transportation equipment, arcades, ceiling dome, and carport, etc., demand for a molded body having a heat ray shielding function has been rapidly increased, which is a function of suppressing the temperature rise in the interior of the room, etc., while maintaining brightness, by shielding the heat ray while sufficiently taking in the visible lights.

Many proposals have been made for the molded body having the heat ray shielding function in response to the above-described demand for the molded body having the heat ray shielding function. For example, a heat ray shielding plate has been proposed in which a heat ray reflective film obtained by vapor-depositing a metal and a metal oxide on a transparent resin film is adhered to a transparent molded body such as a glass, an acrylic plate, a polycarbonate plate or the like.

However, in the production step of the heat ray reflective film, it is necessary to use a vapor deposition apparatus which requires high vacuum and highly accurate atmosphere control, and a cost of itself is very expensive. Further, a complicated step such as an adhesion step is required for producing a heat ray shielding plate in which the heat ray reflective film is adhered to a transparent molded body. Therefore, the heat ray shielding plate involves a higher cost than the heat ray reflective film.

In addition, the heat ray shielding plate also has a problem that the adhesive property between the transparent molded body and the heat ray reflective film is not good, and therefore peeling occurs between the transparent molded body and the heat ray reflective film due to aging.

Meanwhile, a number of heat ray shielding plates obtained by directly depositing the metal or the metal oxide on the surface of the transparent molded body have also been proposed. However, in producing the heat ray shielding plate, similarly to the molded body having the above-described heat ray shielding function, a device which requires high vacuum and highly accurate atmosphere control is necessary. Therefore, a direct vapor deposition method described above is inferior in mass productivity and has poor versatility and there is a disadvantage that the heat ray shielding plate becomes extremely expensive.

In addition to the method of disposing the heat ray reflective film or the heat ray shielding film on the transparent substrate as a means for shielding heat rays, for example, a heat ray shielding plate or a film is proposed, on which a thermoplastic transparent resin such as a polyethylene terephthalate resin, a polycarbonate resin, an acrylic resin, a polyethylene resin, a polystyrene resin or the like is kneaded with an organic near-infrared absorbing agent represented by a phthalocyanine compound or an anthraquinone compound (for example, see patent documents 1 and 2).

However, in order to impart sufficient heat ray shielding ability to the heat ray shielding plate or the film, a large amount of near-infrared absorbing agent must be blended. However, when a large amount of near-infrared absorbing agent is blended in the heat ray shielding plate or the film, there is a problem that a visible light transmitting function is deteriorated. Further, since organic compounds are used as the near-infrared absorbing agents, weather resistance is difficult to apply to window materials of buildings and vehicles which are always exposed to direct sunlight, and too much near-infrared absorbing agent is not necessarily suitable.

Further, for example, a heat ray shielding plate containing inorganic particles such as titanium oxide or mica coated with titanium oxide having a heat ray reflecting function, in a transparent resin such as an acrylic resin or a polycarbonate resin has also been proposed (for example, see patent documents 3 and 4).

However, even in the heat ray shielding plate, it is necessary to add a large amount of particles having a heat ray reflecting function in order to secure the heat ray shielding function. As a result, there is a problem that the visible light transmitting function is lowered as the amount of the particles having the heat ray reflecting function is increased. On the contrary, if an addition amount of particles having a heat ray reflecting function is decreased, the heat ray shielding function is lowered this time although the visible light transmitting function is increased, and therefore it has been difficult to simultaneously satisfy the heat ray shielding function and the visible light transmitting function. Further, too much addition amount of the particles having the hear ray reflecting function also involves a disadvantage in terms of strength, such that physical properties of the transparent resin constituting the molded body, particularly such as an impact strength and toughness are lowered.

Under such a technical background, the present inventors pay attention to hexaboride fine particles having a large amount of free electrons as a component having a heat ray shielding effect. Then, a heat ray shielding resin sheet material in which hexaboride fine particles are dispersed in a polycarbonate resin or an acrylic resin or in which hexaboride fine particles and ITO fine particles and/or ATO fine particles are dispersed (see patent document 5), and a master batch obtained by melt-kneading and dispersing hexaboride fine particles in a thermoplastic resin, are proposed (see patent document 6).

Further, the present inventors propose a heat ray shielding coating liquid in which composite tungsten oxide fine particles are contained in various binders as a heat ray shielding component, the composite tungsten oxide fine particles being expressed by a general formula $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, and W is tungsten, O is oxygen, satisfying $0.001 \leq x/y \leq 1$, $2.0 \leq z/y \leq 3.0$), a heat ray shielding film obtained by coating various molded bodies with this coating liquid and curing the coated molded bodies, and a master batch obtained by melt-kneading and dispersing the composite tungsten oxide fine particles in a thermoplastic resin (for example, see patent documents 7 and 8).

The thermoplastic resin sheet material or the molded body obtained by melt-kneading and dispersing the hexaboride fine particles and the composite tungsten oxide fine particles having the heat ray shielding effect as described above, is basically used outdoors due to its purpose of use, and it is required to have high weather resistance in many cases. However, according to studies by the present inventors, the following problem is found: namely, when a part of a heat ray shielding member (film, resin sheet or the like) containing the composite tungsten oxide fine particles is used outdoors for a long period of time, optical properties are decreased, such as a decrease in a visible light transmittance, a decrease in the heat ray shielding function, change in color tone, increase in haze value, etc., with lapse of the time, due to an influence of heat generated when receiving sunlight, and moisture and oxygen in the air.

The present inventors study on measures to cope with the problem that the infrared shielding material fine particle dispersion body in which the above-described composite tungsten oxide fine particles are dispersed in a medium, causes a change in color tone and a decrease in transmittance due to receiving ultraviolet rays for a long period of time.

Then, it is found that coloring density becomes higher in the infrared shielding material fine particle dispersion body in which the composite tungsten oxide fine particles are dispersed in a polymer medium such as a resin, under a phenomenon of the change in color tone due to receiving ultraviolet rays, because when polymer medium is irradiated with ultraviolet rays, a polymer chain is broken by the energy of the ultraviolet rays, active harmful radicals are generated one after another, deterioration of the polymer progresses in a chain manner, and these harmful radicals reductively act on the composite tungsten oxide fine particles and a pentavalent tungsten is newly increased.

Based on the above-described knowledge, it is found by the present inventors that by preventing deterioration of a polymer medium due to receiving ultraviolet rays, generation of new pentavalent tungsten can be prevented and change in color tone can be suppressed. Then, the present inventors disclose that by making the hindered amine light stabilizer (sometimes described as "HALS" in the present invention) present in the infrared shielding material fine particle dispersion body containing the composite tungsten oxide fine particles, harmful radicals generated due to receiving ultraviolet rays are captured, reduction of the composite tungsten oxide fine particles is prevented, and the change in color tone of the infrared shielding material fine particle dispersion body and the infrared shielding body due to receiving ultraviolet rays can be suppressed (see patent document 9).

The present inventors also study on the capture of the harmful radicals generated due to receiving ultraviolet rays as described above, to prevent reduction of tungsten atoms in the tungsten oxide fine particles and the composite tungsten oxide fine particles, and to suppress the change in color tone of the infrared shielding material due to receiving ultraviolet rays. Then, the present inventors disclose that by making a coloring inhibitor selected from a) a phosphorus-based coloring inhibitor, (b) an amide-based coloring inhibitor, (c) an amine-based coloring inhibitor, (d) a hindered amine-based coloring inhibitor, (e) a hindered phenol-based coloring inhibitor, and (f) a sulfur-based coloring inhibitor, present in the infrared shielding material fine particle dispersion body containing the composite tungsten oxide fine particles, it is possible to suppress the change in color tone of the infrared shielding material due to receiving ultraviolet rays (see patent document 10).

Here, among the above-described coloring inhibitors, the phosphorus-based coloring inhibitor is a coloring inhibitor containing phosphorus, and it is considered that a compound having a phosphorus-containing functional group containing phosphorus is preferable, and some phosphorus-based functional groups include trivalent and pentavalent phosphorus. For example, the phosphorus-based coloring inhibitor is expressed by the following general formula: formula (1) for the phosphorus-based coloring inhibitor having a phosphorus-based functional group containing trivalent phosphorus, formula (2) for the phosphorus-based coloring inhibitor having a phosphorus-based functional group containing pentavalent phosphorus.

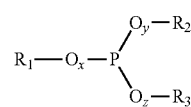
Formula (1)

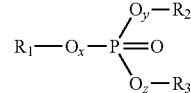
Formula (2)

[In the formulas (1) and (2), x, y, z are 0 or 1. Further, R1, R2 and R3 are each a hydrocarbon group having a linear, cyclic or branched structure expressed by a general formula CmHn or a halogen atom such as fluorine, chlorine, bromine, or a hydrogen atom. Further, $R_2$ or $R_3$ may be a metal atom when y or z is 1.]

In the above-described formulas (1) and (2), the portion excluding $R_1$ (namely, a general formula: —Ox-P(O$_y$R$_2$) (O$_z$R$_3$) or a general formula: —Ox-P(O) (O$_y$R$_2$) (O$_z$R$_3$)) is regarded as a phosphorus-based functional group, and specific examples of the phosphorus-based functional group include: a phosphonic acid group (—P(O) (OH)$_2$), a phosphate group (—O—P(O) (OH)$_2$), a phosphonic acid ester group (—P(O) (OR$_2$) (OR$_3$)), a phosphoric acid ester group (—O—P(O) (OR$_2$) (OR$_3$)), and a phosphine group (—P(R$_2$) (R$_3$)), etc. Among these phosphorus-based functional groups, the phosphonic acid-based coloring inhibitor having the phosphonic acid functional group can efficiently capture metal ions, and is excellent in stability such as hydrolysis resistance, and therefore it can be considered that the phosphonic acid-based coloring inhibitor is particularly suitable as a coloring inhibitor.

Meanwhile, among the above-described phosphorus-based functional groups, the functional group containing pentavalent phosphorus such as the phosphonic acid group, the phosphate group, the phosphonic acid ester group and a phosphoric acid ester group are considered to have mainly chain initiation inhibitory function, namely, a function to chelately capture and inactivate a metal ion serving as a catalyst for generating a harmful peroxide radical by an adjacent phosphorus-based functional groups to inhibit the start of a chain reaction by the peroxide radical.

Further, the phosphorus-based functional group containing trivalent phosphorus, such as a phosphine group, is considered to have mainly a peroxide decomposition function, namely, a function to decompose a peroxide into a stable compound by self-oxidation of P atom and inhibit a reaction of decomposition to radicalization of peroxide.

Further, it is proposed in patent documents 11 and 12 to add a phosphite compound for the purpose of improving the properties of the polycarbonate resin. Then, when the phosphorus-based stabilizer is contained in the polycarbonate resin, there is a problem that the polycarbonate composition becomes opaque with the lapse of time. However, it is proposed in patent document 13 that by further blending a phosphite compound, not only opacity resistance is provided but also excellent thermal decomposition resistance and long-term stability are exhibited.

Further, patent document 14 proposes a hindered phenol compound as an antioxidant in order to improve a melt stability of the resin after completion of a polymerization reaction of the polycarbonate resin, and in patent document 15, it is proposed to add a hindered phenol-based antioxidant for the purpose of preventing coloration when producing the polycarbonate resin.

PRIOR ART DOCUMENT

Patent Document

[Patent Document 1] Japanese Patent Application Laid-Open No. Hei 6-256541
[Patent Document 2] Japanese Patent Application Laid-Open No. Hei 6-264050
[Patent Document 3] Japanese Patent Application Laid-Open No. Hei 2-173060
[Patent Document 4] Japanese Patent Application Laid-Open No. Hei 5-78544
[Patent Document 5] Japanese Patent Application Laid-Open No. 2003-327717
[Patent Document 6] Japanese Patent Application Laid-Open No. 2004-59875
[Patent Document 7] International Publication No. WO 2005/87680 A1 Pamphlet
[Patent Document 8] Japanese Patent Application Laid-Open No. 2008-24902
[Patent Document 9] Japanese Patent Application Laid-Open No. 2006-282736
[Patent Document 10] Japanese Patent Application Laid-Open No. 2008-208274
[Patent Document 11] Japanese Patent Application Laid-Open No. Hei 1-245049,
[Patent Document 12] Japanese Patent Application Laid-Open No. Hei 5-9370
[Patent Document 13] Japanese Patent Application Laid-Open No. 2001-181495
[Patent Document 14] Japanese Patent Application Laid-Open No. Hei 10-219090
[Patent Document 15] Japanese Patent No. 4933704

SUMMARY OF THE INVENTION

Problem to be Solved by the Invention

As described above, the present inventors study on a mechanism of causing a change in color tone and a decrease in transmittance of the infrared shielding material fine particle dispersion body in which the composite tungsten oxide fine particles are dispersed in a polymer medium such as resin, due to receiving ultraviolet rays for a long period of time. As a result, it is found that when the polymer medium used for the infrared shielding material fine particle dispersion body is irradiated with ultraviolet rays, polymer chains are cleaved by ultraviolet energy to generate active harmful radicals one after another, and these harmful radicals reductively act on the composite tungsten oxide fine particles, and the coloring density becomes higher as the pentavalent tungsten is newly increased.

Based on the above knowledge, the present inventors regard the change in color tone and the decrease in transmittance of the infrared shielding material fine particle dispersion body as being caused by the generation of harmful radicals due to the deterioration of the polymer material under ultraviolet energy, and consider that in order to suppress the above-described activity of the harmful radicals, it is effective to add the hindered amine-based light stabilizer and the coloring inhibitor such as a phosphorus-based coloring inhibitor.

Here, the inventors of the present invention conducted research aiming at further improvement of the weather resistance in thermoplastic resin sheet materials and molded bodies.

As a result of the research, an object to be studied is widened to the infrared shielding fine particles having the infrared shielding function, and not only the above-described ultraviolet ray energy but also an influence of a heat generated by the infrared shielding material fine particles when the thermoplastic resin sheet material or the molded body receives sunlight, and an influence of moisture and oxygen in the air, on the infrared shielding material fine particles, is taken into consideration, and based on this consideration, the present inventors study on the decrease in the visible light transmittance with lapse of the time, and deterioration of the heat ray shielding function.

Namely, the present invention is provided, focusing on a problem that the thermoplastic resin sheet material and the molded body containing the infrared shielding material fine particles, cause a functional deterioration such as decrease in the visible light transmittance, decrease in the heat ray shielding function, the change in color tone, and increase in the haze value, etc., with lapse of the time, under the influence of the heat generated when receiving sunlight, and under the influence of the moisture and oxygen in the air. Then, in order to solve the problem, there is provided the thermoplastic resin composition containing the infrared shielding material fine particles and the heat ray shielding molded body and the heat ray shielding lamination body produced using the thermoplastic resin composition, capable of suppressing the deterioration of the weather resistance of the infrared shielding material fine particles, which is caused under the influence of the heat generated when receiving sunlight, and under the influence of the moisture and oxygen in the air.

Means for Solving the Problem

As described above, the present inventors conducted a research on the mechanism of causing the change in color tone and the decrease in transmittance due to receiving ultraviolet rays for a long period of time, in the infrared shielding material fine particle dispersion body in which the composite tungsten oxide fine particles are dispersed in a medium as infrared shielding material fine particles. Then, it is found that when a polymer medium such as a resin used for the infrared shielding material fine particle dispersion body is irradiated with ultraviolet rays, polymer chains are cleaved by ultraviolet energy to generate active harmful radicals one after another, and these harmful radicals reductively act on the composite tungsten oxide fine particles, and the coloring density becomes higher as the pentavalent tungsten is newly increased. It is also found that in order to suppress the activity of the harmful radicals, it is effective to add a hindered amine-based light stabilizer and a coloring inhibitor.

As a result of intensive research for the purpose of solving the above-described problem based on the above-described knowledge, the present inventors found a mechanism of suppressing the decrease in the function of the infrared shielding material itself such as the decrease in the visible light transmittance and the increase in the solar radiation transmittance with lapse of the time, in consideration of not only the above-described ultraviolet ray energy but also an influence of a heat generated by the infrared shielding material fine particles when the thermoplastic resin sheet material or the molded body receives sunlight, and an influence of the moisture and oxygen in the air, on the infrared shielding material fine particles, in order to suppress the change in color tone and the decrease in transmittance of the infrared shielding material fine particle dispersion body due to receiving ultraviolet rays for a long period of time.

Then, it is found that the above-described problem is solved by adding a predetermined amount of a weather resistance improver (for convenience, symbol "(B)" is added in some cases in this specification) to a resin composition containing the composite tungsten oxide fine particles (for convenience, symbol "(A)" is added in some cases in this specification) as the infrared shielding material fine particles, and in which a polycarbonate resin (for convenience, symbol "(C)" is added in some cases in this specification) is used as the thermoplastic resin, or a heat ray shielding molded body in which the resin composition is used. Thus the present invention is achieved.

Here, it is also found that as a form of the weather resistance improver (B), any one of those containing the phosphite compound (for convenience, symbol "(B1)" is added in some cases in this specification), a phosphite compound, one or more kinds selected from a hindered phenol-based stabilizer, a phosphoric acid-based stabilizer, and a sulfur-based stabilizer (for convenience, symbol "(B2)" is added in some cases in this specification), and those containing a hindered phenol-based stabilizer and one or more kinds selected from a phosphoric acid-based stabilizer and a sulfur-based stabilizer (for convenience, symbol "(B3)" is added in some cases in this specification), is preferable.

Namely, in order to solve the above-described problem, a first invention is a polycarbonate resin composition containing a composite tungsten oxide fine particle (A), a weather resistance improver (B), and a polycarbonate resin (C), wherein the composite tungsten oxide fine particle (A) is the composite tungsten oxide fine particle expressed by a general formula $M_xWO_y$ (wherein M element is one or more elements selected from Cs, Rb, K, Tl, In, Ba, Li, Ca, Sr, Fe, Sn, Al, Cu, and Na, W is tungsten, O is oxygen, satisfying $0.1 \leq x \leq 0.5$, $2.2 \leq y \leq 3.0$), and the weather resistance improver (B) is any one of those containing a phosphite compound (B1), or those containing a phosphite compound and one or more kinds selected from a hindered phenol-based stabilizer, a phosphoric acid-based stabilizer and a sulfur-based stabilizer (B2), or those containing a hindered phenol-based stabilizer and one or more kinds selected from a phosphoric acid-based stabilizer and a sulfur-based stabilizer (B3), and an addition amount of the weather resistance improver (B) is 0.1 parts by weight or more and 20 parts by weight or less, based on 1 parts by weight of the composite tungsten oxide fine particles (A).

A second invention is the polycarbonate resin composition, wherein a dispersed particle size of the composite tungsten oxide fine particle (A) is 1 nm or more and 200 nm or less.

A third invention is the polycarbonate resin composition, wherein the structure of the phosphite compound is expressed by general formula (3):

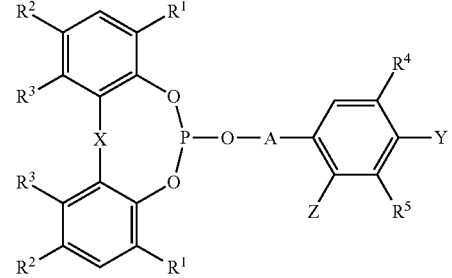

General formula (3)

[wherein in a general formula (3), $R^1$, $R^2$, $R^4$ and $R^5$ each independently indicates a hydrogen atom, an alkyl group having 1 to 8 carbon atoms, a cycloalkyl group having 5 to 12 carbon atoms, an alkyl cycloalkyl group having 5 to 12 carbon atoms, an aralkyl group having 7 to 12 carbon atoms or a phenyl group.

$R_3$ indicates a hydrogen atom or an alkyl group having 1 to 8 carbon atoms, and X indicates a single bond, a sulfur atom or a divalent residue expressed by formula (3-1),

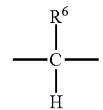

Formula (3-1)

(in formula (3-1), $R^6$ indicates a hydrogen atom, an alkyl group having 1 to 8 carbon atoms or a cycloalkyl group having 5 to 12 carbon atoms.)

A indicates an alkylene group having 2 to 8 carbon atoms or a divalent residue expressed by the formula (3-2),

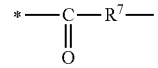

Formula (3-2)

(In formula (3-2), $R^7$ indicates a single bond or an alkylene group having 1 to 8 carbon atoms, and * indicates a bond to the oxygen atom side.)

Y and Z each indicates a hydroxyl group, an alkyl group having 1 to 8 carbon atoms, an alkoxyl group having 1 to 8 carbon atoms or an aralkyloxy group having 7 to 12 carbon atoms, and the other one indicates a hydrogen atom or an alkyl group having 1 to 8 carbon atoms.]

A fourth invention is the polycarbonate resin composition, wherein M element of the general formula $M_xWO_y$ showing the composite tungsten oxide fine particle (A) is one or more kinds selected from Cs and Rb.

A fifth invention is the polycarbonate resin composition, wherein the composite tungsten oxide fine particle (A) has a hexagonal crystal structure.

A sixth invention is a heat ray shielding molded body, which is a molded body of a melt-kneaded product of the polycarbonate resin composition of any one of the first to fifth inventions, polycarbonate resin (C), or a different kind of thermoplastic resin compatible with the polycarbonate resin (C).

A seventh invention a heat ray shielding lamination body, wherein the heat ray shielding molded body of the sixth invention is laminated on other transparent molded body.

Advantage of the Invention

In the polycarbonate resin composition of the present invention, it is possible to suppress the deterioration of weather resistance of the composite tungsten oxide fine particles that occurs under an influence of a heat generated when receiving sunlight, and under an influence of moisture and oxygen in the air, and the polycarbonate resin composition and the heat ray shielding molded body and the heat ray shielding lamination body produced by using the polycarbonate resin composition exhibit excellent weather resistance.

BRIEF DESCRIPTION OF THE DRAWINGS

FIG. 1 is a schematic diagram of a crystal structure of a composite tungsten oxide having a hexagonal crystal structure according to the present invention.

DETAILED DESCRIPTION OF THE INVENTION

The polycarbonate resin composition of the present invention is a polycarbonate resin composition containing a composite tungsten oxide fine particle (A), a polycarbonate resin (C) and a weathering resistance improver (B).

More specifically, the composite tungsten oxide fine particles are the composite tungsten oxide fine particles expressed by a general formula $M_xWO_y$ (wherein M element is an element of one or more kinds selected from Cs, Rb, K, Tl, In, Ba, Li, Ca, Sr, Fe, Sn, Al, Cu, Na, W is tungsten, O is oxygen, satisfying $0.1 \leq x \leq 0.5$, $2.2 \leq y \leq 3.0$). Then, the weather resistance improver is any one of those containing a phosphite compound (B1), or those containing a phosphite compound and one or more kinds selected from a hindered phenol-based stabilizer, a phosphoric acid-based stabilizer and a sulfur-based stabilizer (B2), or those containing a hindered phenol-based stabilizer and one or more kinds selected from a phosphoric acid-based stabilizer and a sulfur-based stabilizer (B3), and an addition amount of the weather resistance improver (B) is 0.1 parts by weight or more and 20 parts by weight or less based on 1 part by weight of the composite tungsten oxide fine particles (A).

Hereinafter, the polycarbonate resin composition, the heat ray shielding molded body and the heat ray shielding lamination body using the polycarbonate resin composition according to the present invention, will be described in detail in an order of (1) Composite tungsten oxide fine particles (A), (2) Weather resistance improver (B), (3) Polycarbonate resin (C), (4) Heat ray shielding molded body, and (5) Heat ray shielding lamination body.

(1) Composite Tungsten Oxide Fine Particles (A)

(a) Composition and Crystal Structure of the Composite Tungsten Oxide Fine Particles According to the Present Invention The composite tungsten oxide fine particles (A) of the present invention are components that exhibit a heat ray shielding effect, and are the composite tungsten oxide fine particles expressed by a general formula $M_xWO_y$ (wherein M element is an element of one or more kinds selected from Cs, Rb, K, Tl, In, Ba, Li, Ca, Sr, Fe, Sn, Al, Cu, Na, W is tungsten, O is oxygen, satisfying $0.1 \leq x \leq 0.5$, $2.2 \leq y \leq 3.0$).

Note that in the general formula $M_xWO_y$ showing the composite tungsten oxide, W indicates tungsten and O indicates oxygen. Further, it is preferable that the M element in the above formula is one or more elements selected from Cs, Rb, K, Tl, In, Ba, Li, Ca, Sr, Fe, Sn, Al, Cu and Na.

As described above, the composite tungsten oxide is expressed by the general formula $M_xWO_y$, and has a composition in which the M element is added to tungsten oxide ($WO_y$).

It is known that tungsten oxide ($WO_y$) which is a material to be a base of the composite tungsten oxide also has infrared absorption properties. Then, in the case of the tungsten oxide, effective free electrons are not present in tungsten trioxide ($WO_3$), and therefore the absorption and reflection properties in a near-infrared region are small. However, by setting a value of y which is the ratio of oxygen to tungsten of the tungsten oxide ($WO_y$) to less than 3, free electrons are generated in the tungsten oxide, and infrared absorbing particles with high efficiency can be obtained. However, a crystal phase of $WO_2$ causes absorption and scattering of the light in a visible region, which may lower the absorption of light in a near-infrared region in some cases.

Therefore, in the case of the particles of tungsten oxide, when the value of y in a chemical formula expressed by $WO_y$ satisfies $2.2 \leq y < 3.0$, generation of the crystal phase of $WO_2$ is suppressed, and the infrared absorbing particles with high efficiency can be obtained.

Further, in the tungsten oxide particles, a so-called "Magneli phase" having a composition ratio expressed by $2.45 \leq y < 3.0$ is chemically stable, and it has good light absorption properties in the near-infrared region, and therefore it can be used more preferably as the infrared absorbing particles.

Then, in the case of the composite tungsten oxide fine particles used in the polycarbonate resin composition, the heat ray shielding molded body using the same, and the heat ray shielding lamination body using the same according to the present invention, by adding M element to the tungsten oxide, free electrons are generated in the composite tungsten oxide, and stronger absorption properties derived from the free electrons are developed in the near-infrared region. Therefore, particularly high properties are exhibited as an infrared absorbing material absorbing near-infrared rays.

The composite tungsten oxide used in the present invention can be a more efficient infrared absorbing material, by controlling the oxygen amount described in the above-described properties of the tungsten oxide, and by adding the M element which generates free electrons in combination. By controlling the oxygen amount and adding the M element which generates free electron in combination, in the general formula $M_xWO_y$ indicating the composite tungsten oxide, x and y are preferably in a range of $0.1 \leq x \leq 0.5$ and $2.2 \leq y \leq 3.0$.

Here, explanation will be given for the value of x indicating the addition amount of the M element in the chemical formula of the composite tungsten oxide. When the value of x is 0.1 or more, a sufficient amount of free electrons is generated and a target infrared absorption effect can be obtained, which is preferable. Then, as the addition amount of the M element is increased, a supply amount of the free electrons is increased and the infrared absorption efficiency is also increased. However, when the value of x is about 0.5, the effect is saturated. Further, when the value of x is 0.5 or less, generation of an impurity phase in the infrared absorbing material can be avoided, which is preferable.

Next, explanation will be given for the value of y indicating the control of the oxygen amount. It is preferable that the value of y is in a range of $2.2 \leq y \leq 3.0$, because even in the infrared absorbing material expressed by the general formula $M_xWO_y$, the same mechanism as the tungsten oxide ($WO_y$) works, and in addition, even at y=3.0, there is supply of the free electrons by the above-described addition amount of the M element. Particularly, as shown in the above explanation for tungsten oxide, $2.45 \leq y \leq 3.0$ is more preferable because more chemically stable state can be obtained.

The crystal structure of the composite tungsten oxide contained in the composite tungsten oxide fine particles is not particularly limited, and the composite tungsten oxide having an arbitrary crystal structure can be contained. However, when the composite tungsten oxide contained in the composite tungsten oxide fine particles has a hexagonal crystal structure, the transmittance of light through the particles in the visible region and the absorption of light in the near-infrared region are particularly improved, which is preferable.

A schematic plan view of the crystal structure of the hexagonal composite tungsten oxide is shown in FIG. 1. In FIG. 1, a hexagonal space (tunnels) is formed by assembling six octahedrons formed by units of $WO_6$ indicated by reference numeral 11. Then, the M element indicated by reference numeral 12 is arranged in the space to constitute one unit, and a large number of these units gather to form a hexagonal crystal structure.

As described above, in the case of containing the composite tungsten oxide fine particles having the hexagonal crystal structure, the light transmittance in the visible region and the light absorption in the near-infrared region can be particularly improved. Note that it is not necessary that the entire composite tungsten oxide fine particles are composed of the crystalline composite tungsten oxide particles having the structure shown in FIG. 1, and it is possible to obtain the effect of improving the light transmittance in the visible region and the light absorption in the near-infrared region, for example even when the composite tungsten oxide fine particle locally has the above structure.

Then, when the M element having a large ionic radius is added as the M element of the composite tungsten oxide, the above-described hexagonal crystal structure is likely to be formed. Specifically, the hexagonal crystal structure is likely to be formed when one or more kinds of Cs, Rb, K, and Tl are added as the M element, for example. Therefore, the M element preferably contains one or more kinds of Cs, Rb, K, and Tl, and more preferably, the M element is one or more kinds of Cs, Rb, and K. Note that in order to form the hexagonal crystal structure, it is only necessary for the elements other than these elements to be present in the hexagonal spaces formed by $WO_6$ units, and the present invention is not limited to the case that the above element is added as the M element.

When the crystal structure of the composite tungsten oxide contained in the composite tungsten oxide fine particles is made into a uniform hexagonal crystal structure, it is more preferable that the value of x indicating the addition amount of the element M satisfies $0.20 \leq x \leq 0.50$, and more preferably $0.25 \leq x \leq 0.40$. As described above, y is preferably in a range of $2.2 \leq y \leq 3.0$. When y=3.0, it is considered that the value of x becomes 0.33, so that the M element is arranged in all of the hexagonal spaces. Typical examples include $Cs_{0.33}WO_3$, $Rb_{0.33}WO_3$, $K_{0.33}WO_3$, $Tl_{0.33}WO_3$, etc. However, when x and y fall within the above-described range, useful near-infrared absorption properties can be obtained.

Further, the composite tungsten oxide contained in the composite tungsten oxide fine particles may have a structure of a tetragonal or cubic tungsten bronze other than the above-described hexagonal crystal structure, and the composite tungsten oxide having the above-described crystal structure is also effective as an infrared absorbing material, namely, it can be suitably used as a material contained in the composite tungsten oxide particles to be added to the heat ray shielding film. Due to its crystal structure, an absorption position of the composite tungsten oxide is likely to be varied in the near-infrared region. For example, the absorption position in the near-infrared region is shifted to a longer wavelength side in a case of the tetragonal crystal structure rather than a case of the cubic crystal structure, and further is likely to shift toward the longer wavelength side in a case of the hexagonal crystal structure rather than a case of the tetragonal crystal structure. Further, along with a variation of the absorption position, absorption of the light in the visible region is the smallest in the case of the hexagonal crystal structure, followed by the tetragonal crystal structure, and among them, the absorption of the light in the visible light region is largest in the case of the cubic crystal structure. Therefore, high light transmittance in the visible region and high light absorption in the near-infrared region are required, it is preferable to use the hexagonal tungsten bronze. However, the tendency of the optical properties described here is absolutely a rough tendency, and there is a variation depending on the kind of the added M element, the addition amount, and the oxygen amount. Therefore, the material of the infrared absorbing particles used for the heat ray shielding film of the present invention is not limited to a hexagonal material. Accordingly, the composite tungsten oxide having the above-described other crystal structure may be simultaneously contained. Further, in order to improve the light transmission property in the visible light region and to obtain the effect of improving the light absorption properties in the near-infrared region, it is sufficient that the unit structure described in FIG. 1 (a structure in which hexagonal spaces are formed by assembling six octahedrons formed by $WO_6$ units and M elements are arranged in the spaces) is contained in the composite tungsten oxide fine particles, and the composite tungsten oxide fine particles may be crystalline or amorphous.

However, as described above, the hexagonal composite tungsten oxide particles can increase the visible light transmittance and the near-infrared light absorption. Therefore, the composite tungsten oxide of the composite tungsten oxide fine particles contained in the polycarbonate resin composition, the heat ray shielding molded body using the same, and the heat ray shielding lamination body using the same according to the present invention preferably has the hexagonal crystal structure.

Further, in the case of using, for example, Cs and/or Rb as the M element, the crystal structure of the composite tungsten oxide is likely to be hexagonal as described above. Further, since the light transmittance in the visible region is high and the light transmittance in the infrared region, particularly in the near-infrared region is low, a contrast between light transmittance in the visible region and light transmittance in the infrared region becomes large. Therefore, it is further preferable that the M element of the general formula $M_XWO_y$ indicating the composite tungsten oxide is Cs and/or Rb. Particularly, when the M element contains Cs, weather resistance of the composite tungsten oxide becomes higher, and therefore the M element particularly preferably contains Cs.

(b) Dispersed Particle Size of the Composite Tungsten Oxide Fine Particles of the Present Invention When it is important to reduce light scattering due to particles, the dispersed particle size of the composite tungsten oxide fine particles used in the present invention is preferably 200 nm or less, and more preferably 100 nm or less. This is because if the dispersed particle size of the dispersed particles is small, scattering of the light is reduced in the visible light region with a wavelength of 400 nm to 780 nm due to geometric scattering or Mie scattering. As a result of reducing the scattering of the light, it is possible to avoid a situation that a heat ray shielding film becomes like a frosted glass and it becomes impossible to obtain clear transparency. Namely, this is because when the dispersed particle size becomes 200 nm or less, the geometric scattering or the Mie scattering is reduced, and a Rayleigh scattering region is formed. Also this is because in the Rayleigh scattering region, a scattered light intensity is proportional to the sixth power of the particle size, and therefore scattering is decreased along with the decrease of the dispersed particle size, and transparency is improved. Further, when the dispersed particle size is 100 nm or less, the scattered light is extremely decreased, which is preferable. From a viewpoint of avoiding the light scattering, it is preferable that the dispersed particle size is small, and if fine particles having a dispersed particle size of 1 nm or more are used, industrial production is easy. Note that in the present invention, the dispersed particle size of the fine particles means a diameter of the agglomerated particles produced by the aggregation of the fine particles dispersed in the medium, and can be measured using various commercially available particle size distribution meters. For example, the dispersed particle size can be obtained by collecting a sample in a state in which single fine particles or aggregates of fine particles are present, from the fine particle dispersion liquid, and measuring the sample using a particle size distribution meter based on a principle of dynamic light scattering method.

(c) Effect of the Composite Tungsten Oxide Fine Particles of the Present Invention The composite tungsten oxide fine particles of the present invention have infrared absorption properties. As a result, the polycarbonate resin composition, the heat ray shielding molded body using the same, and the heat ray shielding lamination body using the same according to the present invention, can suppress the light transmission in the infrared region, particularly in the near-infrared region, and can exhibit the heat ray shielding ability, by containing the composite tungsten oxide fine particles.

Further, since the absorption coefficient of the light in the visible region of the composite tungsten oxide fine particles of the present invention is very small as compared with the absorption coefficient in the near-infrared region, high transparency to the light in the visible region can be maintained, even when the light transmission in the near-infrared region is sufficiently suppressed.

(2) Weather Resistance Improver (B)

The weather resistance improver is any one of three forms (sometimes referred to as addition forms in some cases) such as:

those containing a phosphite compound (B1), or those containing a phosphite compound and one or more kinds selected from a hindered phenol-based stabilizer, a phosphoric acid-based stabilizer and a sulfur-based stabilizer (B2), or those containing a hindered phenol-based stabilizer and one or more kinds selected from a phosphoric acid-based stabilizer and a sulfur-based stabilizer (B3).

The addition amount of the weather resistance improver (B) is 0.1 parts by weight or more and 20 parts by weight or less based on 1 parts by weight of the composite tungsten oxide fine particles (A).

When the addition amount of the weather resistance improver (B) is 0.1 parts by weight or more based on 1 parts by weight of the composite tungsten oxide fine particles (A), it is possible to obtain a desired weather resistance improving effect, which is preferable.

Meanwhile, when the addition amount is 20 parts by weight or less, there is no concern about a reduction of a mechanical strength of the molded body, which is preferable.

Namely, by making the predetermined amount of the weather resistance improver (B) into the above-described form of the polycarbonate resin composition, it is possible to suppress the deterioration of the weather resistance of the polycarbonate resin composition containing the composite tungsten oxide fine particles, which occurs due to not only the above-described ultraviolet ray energy but also the influence of the heat generated when receiving the sunlight and the influence of the moisture and the oxygen in the air. As a result, it is possible to obtain the polycarbonate resin composition excellent in weather resistance, the heat ray shielding molded body and the heat ray shielding lamination body excellent in weather resistance produced using the polycarbonate resin composition.

By adopting the above-described constitution, the polycarbonate resin composition of the present invention, can enhance the effect of not only suppressing the influence of the ultraviolet energy which has been conventionally studied, but also suppressing the deterioration of the weather resistance of the polycarbonate resin composition containing the composite tungsten oxide fine particles caused by the heat generated when receiving sunlight and by the moisture and oxygen in the air, and it is possible to obtain the heat ray shielding molded body and the heat ray shielding lamination body excellent in weather resistance produced using the polycarbonate resin composition.

It has been proposed to use the phosphite compound expressed by general formula (3) for the purpose of improving the properties of the polycarbonate resin.

Specifically, in order to suppress the deterioration of the color tone and the physical properties due to thermal decomposition during processing and polymerization of the polycarbonate resin, patent documents 11 and 12 propose a method of containing a phosphorous-based stabilizer such as bis (2,6-di-t-butyl-4-methylphenyl) pentaerythritol diphosphite and 2,2'-methylenebis (4,6-di-t-butylphenyl) 2-ethylhexyl phosphite in the polycarbonate.

However, when the phosphorus-based stabilizer is contained in the polycarbonate resin, there is a problem that the polycarbonate composition becomes opaque with the lapse of time.

In order to cope with this problem, by blending the phosphite compound expressed by the above-described general formula (3), patent document 13 proposes that not only excellent resistance to opacity is obtained but also excellent thermal decomposition resistance and long-term stability are exhibited.

However, patent document 13 describes a result of processing stability, a result of long-term stability obtained by evaluating the change in color tone, a result obtained by evaluating the resistance to opacity obtained by an evaluation over time regarding the opacity, which are shown in the polycarbonate composition obtained by adding a phosphite compound expressed by the above-described general formula (3) or a phosphorus-based stabilizer conventionally used, to an aromatic polycarbonate resin, and melt-kneading and pelletizing a mixture at 300° C. using a twin-screw extruder.

Namely, the purpose of using the phosphite compound and the phosphorus-based stabilizer described in patent documents 11 to 13 is a guarantee of stability, particularly optical stability of the polycarbonate resin, in a process in which a large amount of heat or mechanical force is applied for a relatively short period of time, such as during polymerization, kneading and molding of the polycarbonate resin.

Meanwhile, the object of the present invention is to suppress the deterioration of the optical properties of the composite tungsten oxide fine particles contained in the polycarbonate resin composition due to the influence of receiving sunlight, and due to the moisture and the oxygen in the air for a long period of time, and to improve the weather resistance. However, patent documents 11 to 13, which are different from the object of the present invention neither describe nor suggest the use and the effect of the phosphite compound and the phosphorus-based stabilizer for improving the weather resistance of the composite tungsten oxide fine particles.

Namely, through the present inventor's own research, the following effect is found for the first time: the phosphite compound expressed by general formula (3) improves the weather resistance of the polycarbonate resin composition containing the composite tungsten oxide fine particles.

Explanation will be given hereafter using specific examples, for a) a phosphite compound, b) a hindered phenol-based stabilizer, c) a phosphoric acid-based stabilizer, and d) a sulfur-based stabilizer, respectively used in the weather resistance improver (B).

a) Phosphite Compound

The phosphite compound (addition form B1 or B2) used in the polycarbonate resin composition of the present invention is a compound expressed by general formula (3).

General formula (3)

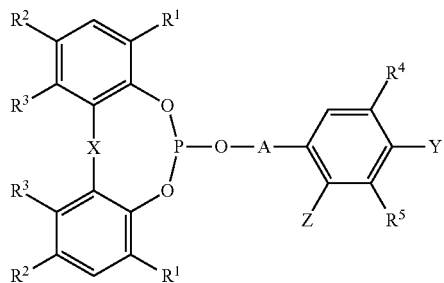

In the general formula (3), $R^1$, $R^2$, $R^4$ and $R^5$ each independently indicates a hydrogen atom, an alkyl group having 1 to 8 carbon atoms, a cycloalkyl group having 5 to 12 carbon atoms, an alkylcycloalkyl group having 5 to 12 carbon atoms, an aralkyl group having 7 to 12 carbon atoms or a phenyl group.

$R^3$ indicates a hydrogen atom or an alkyl group having 1 to 8 carbon atoms.

X indicates a single bond, a sulfur atom or a divalent residue expressed by formula (3-1).

Formula (3-1)

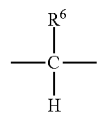

(In the formula (3-1), $R^6$ indicates a hydrogen atom, an alkyl group having 1 to 8 carbon atoms or a cycloalkyl group having 5 to 12 carbon atoms.)

A indicates an alkylene group having 2 to 8 carbon atoms or a divalent residue expressed by formula (3-2).

Formula (3-2)

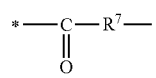

(In formula (3-2), $R^7$ indicates a single bond or an alkylene group having 1 to 8 carbon atoms, and * indicates a bond to the oxygen atom side.)

One of Y and Z indicates a hydroxyl group, an alkyl group having 1 to 8 carbon atoms, an alkoxyl group having 1 to 8 carbon atoms or an aralkyloxy group having 7 to 12 carbon atoms, and the other one indicates a hydrogen atom or an alkyl group having 1 to 8 carbon atoms.

Here, explanation will be given hereafter in further detail, for (i) $R^1$, $R^2$, $R^4$ and $R^5$, (ii) $R^3$, (iii) X, (iv) A, (v) Y, Z, (vi) summary.

(i) $R^1$, $R^2$, $R^4$ and $R^5$

In the phosphite compound expressed by general formula (3), $R^1$, $R^2$, $R^4$ and $R^5$ each independently indicates a hydrogen atom, an alkyl group having 1 to 8 carbon atoms, a cycloalkyl group having 5 to 12 carbon atoms, an alkylcycloalkyl group having 5 to 12 carbon atoms, an aralkyl group or a phenyl group having 7 to 12 carbon atoms.

Examples of the alkyl group having 1 to 8 carbon atoms include: a methyl group, an ethyl group, n-propyl group, i-propyl group, n-butyl group, i-butyl group, sec-butyl group, t-butyl group, t-pentyl group, i-octyl group, t-octyl group, and 2-ethylhexyl group, etc.

Examples of the cycloalkyl group having 5 to 12 carbon atoms include: cyclopentyl group, cyclohexyl group, cycloheptyl group, cyclooctyl group, 1-methylcyclopentyl group, 1-methylcyclohexyl group, and 1-methyl-4-i-propylcyclohexyl group, etc. Examples of the alkylcycloalkyl group having 5 to 12 carbon atoms include: a methylcyclopentyl group, a dimethylcyclopentyl group (including all structural isomers), a methyl ethyl cyclopentyl group (including all structural isomers), a diethyl cyclopentyl group (including all structural isomers), a methyl cyclohexyl group, a dimethyl cyclohexyl group (including all structural isomers), a methylethyl cyclohexyl group (including all structural isomers), a diethylcyclohexyl group (including all structural isomers), a methylcycloheptyl group, a dimethylcycloheptyl group (including all structural isomers), a methylethylcycloheptyl group (including all structural isomers), and a diethylcycloheptyl group (including all structural isomers), etc.

Examples of the aralkyl group having 7 to 12 carbon atoms include: a benzyl group, α-methylbenzyl group, α,α-dimethylbenzyl group, etc.

Examples of the phenyl group having 7 to 12 carbon atoms include: a phenyl group, a naphthyl group, 2-methylphenyl group, 4-methylphenyl group, 2,4-dimethylphenyl group, and 2,6-dimethylphenyl group, etc.

Here, $R^1$, $R^2$ and $R^4$ are preferably an alkyl group having 1 to 8 carbon atoms, a cycloalkyl group having 5 to 12 carbon atoms, or the like. Then, $R^1$ and $R^4$ are more preferably t-alkyl group such as t-butyl group, t-pentyl group, t-octyl group, a cyclohexyl group, 1-methylcyclohexyl group or the like.

$R^2$ is preferably an alkyl group having 1 to 5 carbon atoms such as a methyl group, an ethyl group, n-propyl group, i-propyl group, n-butyl group, i-butyl group, sec-butyl group, and t-pentyl group, and more preferably a methyl group, t-butyl group, t-pentyl group or the like.

$R^5$ is preferably a hydrogen atom, an alkyl group having 1 to 5 carbon atoms such as a methyl group, an ethyl group, n-propyl group, i-propyl group, n-butyl group, i-butyl group, a sec-butyl group, a t-butyl group, and t-pentyl group or the like.

(ii) $R^3$ $R^3$ indicates a hydrogen atom or an alkyl group having 1 to 8 carbon atoms, and the alkyl group having 1 to 8 carbon atoms includes the same alkyl groups having 1 to 8 carbon atoms as those indicated by $R^1$, $R^2$, $R^4$ and $R^5$ described above. $R^3$ is preferably the hydrogen atom or the same alkyl group having 1 to 5 carbon atoms as those indicated by $R^2$, and more preferably a hydrogen atom, and a methyl group or the like.

(iii) X

X indicates a single bond, a sulfur atom or a divalent residue expressed by formula (3-1).

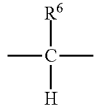

Formula (3-1)

(In the formula, $R^6$ indicates the hydrogen atom, the alkyl group having 1 to 8 carbon atoms or the cycloalkyl group having 5 to 12 carbon atoms.)

In the divalent residue expressed by formula (3-1), $R^6$ indicates the hydrogen atom, the alkyl group having 1 to 8 carbon atoms or the cycloalkyl group having 5 to 12 carbon atoms. Here, examples of the alkyl group having 1 to 8 carbon atoms and the cycloalkyl group having 5 to 12 carbon atoms include (i) the same alkyl group and cycloalkyl group as those indicated by $R^1$, $R^2$, $R^4$ and $R^5$ respectively.

Among them, $R^6$ is preferably the hydrogen atom, the alkyl group having 1 to 5 carbon atoms such as a hydrogen atom, the methyl group, the ethyl group, n-propyl group, i-propyl group, n-butyl group, i-butyl group or the like.

X is preferably a single bond, the methylene group, or the methylene group in which methyl, ethyl, n-propyl, i-propyl, n-butyl, i-butyl, and t-butyl, etc., are substituted, and more preferably a single bond.

(iv) A

A indicates the alkylene group having 2 to 8 carbon atoms or a divalent residue expressed by formula (3-2).

Examples of the alkylene group having 2 to 8 carbon atoms include: an ethylene group, a propylene group, a butylene group, a pentamethylene group, a hexamethylene group, an octamethylene group, 2,2-dimethyl-1,3-propylene group or the like, and a propylene group is further preferable.

The divalent residue expressed by formula (3-2) is bonded to the oxygen atom and a benzene nucleus, and * indicates the bond to the oxygen atom.

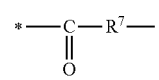

Formula (3-2)

(In the formula, $R^7$ indicates a single bond or the alkylene group having 1 to 8 carbon atoms, and * indicates a bond to the oxygen atom side.)

$R^7$ indicates a single bond or the alkylene group having 1 to 8 carbon atoms. Here examples of the alkylene group having 1 to 8 carbon atoms include: a methylene group, an ethylene group, a propylene group, a butylene group, a pentamethylene group, a hexamethylene group, an octamethylene group, 2,2-dimethyl-1,3-propylene group or the like. Particularly, $R^7$ indicates preferably a single bond, the ethylene group or the like.

(v) Y, Z

One of Y and Z indicates a hydroxyl group, an alkyl group having 1 to 8 carbon atoms, an alkoxyl group having 1 to 8 carbon atoms or an aralkyloxy group having 7 to 12 carbon atoms, and the other one indicates a hydrogen atom or an alkyl group having 1 to 8 carbon atoms.

Here, examples of the alkyl group having 1 to 8 carbon atoms include: preferably the same alkyl groups as those indicated by (i) $R^1$, $R^2$, $R^4$ and $R^5$.

Examples of the alkoxyl group having 1 to 8 carbon atoms include: preferably a methoxy group, an ethoxy group, n-propoxy group, i-propoxy group, n-butoxy group, i-butoxy group, sec-butoxy group, t-butoxy group, t-pentoxy group, i-octoxy group, t-octoxy group, 2-ethylhexyl group, or the like.

Examples of the aralkyloxy group having 7 to 12 carbon atoms include: preferably a benzyloxy group, α-methylbenzyloxy group, α, α-dimethylbenzyloxy group or the like.

Y of Y and Z indicates for example a hydroxyl group, an alkyl group having 1 to 8 carbon atoms, an alkoxyl group having 1 to 8 carbon atoms or an aralkyloxy group having 7 to 12 carbon atoms, and Z may be a hydrogen atom or an alkyl group having 1 to 8 carbon atoms, or Z may be a hydroxyl group, an alkyl group having 1 to 8 carbon atoms, an alkoxyl group having 1 to 8 carbon atoms or an aralkyloxy group having 7 to 12 carbon atoms, and Y may be a hydrogen atom or an alkyl group having 1 to 8 carbon atoms.

(VI) Summary

Among the phosphite compound expressed by general formula (3), it is particularly preferable that $R^1$ and $R^4$ indicate t-alkyl groups, cyclohexyl or 1-methylcyclohexyl groups, $R^2$ indicates an alkyl group having 1 to 5 carbon atoms, $R^5$ indicates a hydrogen atom or an alkyl group having 1 to 5 carbon atoms, $R^3$ indicates a hydrogen atom or an alkyl group having 1 to 5 carbon atoms, X indicates a single bond and A indicates an alkylene group having 2 to 8 carbon atoms.

More specifically, examples of the phosphite compound preferably include: 2,4,8,10-tetra-t-butyl-6-[3-(3-methyl-4-hydroxy-5-t-butylphenyl) propoxy] dibenzo [d, f][1,3,2]

which is commercially available as dioxaphosphepin ["Sumilizer (registered trademark) GP" (manufactured by Sumitomo Chemical Co., Ltd.)], 2,10-dimethyl-4,8-di-t-butyl-6-[3-(3,5-di-t-butyl-4-hydroxyphenyl) propoxy]-12H-dibenzo [d, g][1,3,2]dioxaphosphocin, 2,4,8,10-tetra-t-butyl-6-[3-(3,5-di-t-butyl-4-hydroxyphenyl) propoxy] dibenzo [d, f][1,3,2]dioxaphosphepin, 2,4,8,10-tetra-t-pentyl-6-[3-(3,5-di-t-butyl-4-hydroxyphenyl) propoxy]-12-methyl-12H-dibenzo [d, g][1,3,2] dioxaphosphocin, 2,10-dimethyl-4,8-di-t-butyl-6-[3-(3,5-di-t-butyl-4-hydroxyphenyl) propionyloxy]-12H-dibenzo [d, g][1,3,2]dioxaphosphocin, 2,4,8,10-tetra-t-pentyl-6-[3-(3,5-di-t-butyl-4-hydroxyphenyl) propionyloxy]-12-methyl-12H-dibenzo [d, g][1,3,2] dioxaphosphocin, 2,4,8,10-tetra-t-butyl-6-[3-(3,5-di-t-butyl-4-hydroxyphenyl) propionyloxy]-dibenzo [d, f][1,3,2]dioxaphosphepin, 2,10-dimethyl-4,8-di-t-butyl-6-(3,5-di-t-butyl-4-hydroxybenzoyloxy)-12H-dibenzo [d, g][1,3,2] dioxaphosphocin, 2,4,8,10-tetra-t-butyl-6-(3,5-di-t-butyl-4-hydroxybenzoyloxy]-12-methyl-12H-dibenzo [d, g][1,3,2] dioxaphosphocin, 2,10-dimethyl-4,8-di-t-butyl-6-[3-(3-methyl-4-hydroxy-5-t-butylphenyl) propoxy]-12H-dibenzo [d, g][1,3,2]dioxaphosphocin, 2,4,8,10-tetra-t-butyl-6-[3-(3, 5-di-t-butyl-4-hydroxyphenyl) propoxy]-12H-dibenzo [d, g][1,3,2]dioxaphosphocin, 2,10-diethyl-4,8-di-t-butyl-6-[3-(3,5-di-t-butyl-4-hydroxyphenyl) propoxy]-12H-dibenzo [d, g][1,3,2] dioxaphosphocin, 2,4,8,10-tetra-t-butyl-6-[2,2-dimethyl-3-(3-t-butyl-4-hydroxy-5-methylphenyl) propoxy]-dibenzo [d, f][1,3,2]dioxaphosphepin, etc.

As the phosphite compound (addition form B1 or B2), for example, a commercially available product can also be used. For example, Sumilizer (registered trademark) GP (manufactured by SUMITOMO CHEMICAL CO., LTD.), etc., which is given above can be preferably used.

b) Hindered Phenol-Based Stabilizer

In the polycarbonate resin composition containing the composite tungsten oxide fine particles, the polycarbonate resin, and the weather resistance improver according to the present invention, it is also preferable to have a configuration of using those containing the phosphite compound and the hindered phenol-based stabilizer (addition form B2) described above, or those containing the hindered phenol-based stabilizer and one or more kinds selected from the phosphoric acid-based stabilizer, and the sulfur-based stabilizer (addition form B3), as the weather resistance improver.

This is because by adopting this configuration, it is possible to obtain the polycarbonate resin composition and the heat ray shielding molded body using the same, having the effect of not only suppressing the deterioration of the weather resistance of the polycarbonate resin composition containing the composite tungsten oxide fine particles caused by the influence of the heat generated when receiving sunlight and by influence of the moisture and oxygen in the air, but also suppressing the deterioration of the polycarbonate resin due to the ultraviolet energy in the sunlight.

The hindered phenol-based stabilizer has been conventionally proposed as an antioxidant in order to improve melt stability of the resin after completion of a polymerization reaction of the polycarbonate resin (see patent document 14), and patent document 15 proposes to add the hindered phenol-based stabilizer as the hindered phenol-based antioxidant when producing the polycarbonate resin, for the purpose of preventing coloring.

However, patent document 15 neither describes nor suggests the purpose of enhancing the effect of suppressing the deterioration of the weather resistance of the polycarbonate resin composition containing the composite tungsten oxide fine particles by the hindered phenol type stabilizer, and the effect thereof.

When those containing the phosphite compound and hindered phenol-based stabilizer (addition form B2), or those containing the hindered phenol-based stabilizer and one or more kinds selected from the phosphoric acid-based stabilizer and the sulfur-based stabilizer (addition form B3) are used as the weather resistance improver (B) to be used in the present invention, a compound to which a bulky group such as a tert-butyl group is introduced to o-position of the phenolic OH group, is preferable as an example of the hindered phenol-based stabilizer.

Then, suitable examples of a low molecular weight type hindered phenol-based stabilizer include:

2,6-tert-butyl-p-cresol, 2,6-di-tert-butyl-phenol, 2,4-dimethyl-6-tert-butyl-phenol, butylhydroxyanisole, 2,2'-methylenebis (4-methyl-6-tert-butylphenol), 4,4'-butylidenebis (3-methyl-6-tert-butylphenol), 4,4'-thiobis (3-methyl-6-tert-butylphenol), tetrakis [methylene-3 (3,5-di-tert-butyl-4-hydroxyphenyl) propionate]methane, and 1,1,3-tris (2-methyl-4-hydroxy-5-tert-butylphenyl) butane, etc.

Further, preferable examples of the polymer type hindered phenol-based stabilizer include:

polymers of monomers such as vinyl, acrylic, methacrylic, and styryl having the hindered phenol-based coloring inhibitor in the side chain, and a polymer, etc., in which the structure of the hindered phenol-based coloring inhibitor is incorporated in the main chain.

Note that the polymer type hindered phenol-based stabilizer may be more preferable than the low molecular weight type hindered phenol-based stabilizer in some cases. Further, when the polymer type compound is used, a crosslinked structure may be further introduced into the compound.

It is considered that the hindered phenol-based stabilizer mainly has a chain inhibiting function (namely, a function that phenolic OH group in the stabilizer captures radicals and suppresses a chain reaction by radicals).

In contrast, in the present invention, by using those containing the phosphite compound and the hindered phenol-based stabilizer (addition form B2), or those containing the hindered phenol-based stabilizer and one or more kinds selected from the phosphoric acid-based stabilizer and the sulfur-based stabilizer (addition form B3) as the weather resistance improver (B), it is possible to enhance the effect of not only suppressing the influence of the ultraviolet energy which has been conventionally studied, but also suppressing the deterioration of the weather resistance of the polycarbonate resin composition containing the composite tungsten oxide fine particles caused by the heat generated when receiving sunlight and by the moisture and oxygen in the air. However, an effect of the action and a process of the action by the weather resistance improver have not been clarified in many points, and details have not been clarified yet.

c) Phosphoric Acid-Based Stabilizer

Those containing the phosphite compound and the phosphoric acid-based stabilizer (addition form B2) as described above, or those containing the hindered phenol-based stabilizer and the phosphoric acid-based stabilizer (addition form B3) as described above, are preferable as the weather resistance improver (B) in the polycarbonate resin composition containing the composite tungsten oxide fine particles (A), the polycarbonate resin (C), and the weather resistance improver.

This is because it is possible to obtain the effect of enhancing the effect of suppressing the deterioration of the weather resistance by the phosphite compound expressed by general formula (3) and the hindered phenol-based stabilizer described above, in the same manner as in the polycarbonate resin composition containing the composite tungsten oxide fine particles.

An example of the phosphoric acid-based stabilizer includes a phosphorus-based coloring inhibitor, and further a compound having a phosphorus-based functional group. Here, the phosphorus-based functional group includes a trivalent phosphorus-containing functional group and a pentavalent phosphorus-containing functional group, but any "phosphorus-based functional group" may be used in the present embodiment. The following formula (1) is a general formula of the phosphorus-based coloring inhibitor having the phosphorus-based functional group containing trivalent phosphorus, and the following formula (2) is a general formula of the phosphorus coloring inhibitor having the phosphorus-based functional group containing pentavalent phosphorus.

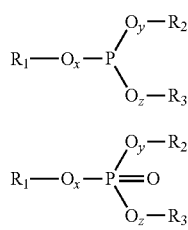

Formula (1)

Formula (2)

Here, in the formulas (1) and (2), the value of x, y, and z is 0 or 1. Further, $R_1$, $R_2$ and $R_3$ indicate a hydrocarbon group having a straight chain, cyclic or branched structure expressed by a general formula CmHn, or a halogen atom such as fluorine, chlorine, bromine, or a hydrogen atom. Further, when the value of y or z is 1, $R_2$ or $R_3$ may be a metal atom.

Further, the "phosphorus-based functional group" means a portion excluding $R_1$ in formulas (1) and (2) (which is expressed by a general formula —Ox-P(OyR$_2$) (OzR$_3$) or expressed by a general formula —Ox-P(O) (OyR$_2$) (Oz R$_3$)). Specific examples of the phosphorus-based functional group include: a phosphonic acid group (—P(O) (OH)$_2$), a phosphate group (—O—P(O) (OH)$_2$), phosphoric acid ester group (—P(O) (OR$_2$) (OR$_3$)), phosphoric acid ester group (—O—P(O) (OR$_2$) (OR$_3$)), and phosphine group (—P(R$_2$) (R$_3$)) etc.

Among the above-described phosphorus-based functional groups, functional groups containing pentavalent phosphorus such as phosphonic acid group, phosphate group, phosphonic acid ester group, and phosphoric acid ester group, etc., are considered to have mainly a chain initiation inhibitory function (namely, a function of chelately capturing metal ions by adjacent phosphorus-based functional groups). Meanwhile, phosphorus-based functional groups containing trivalent phosphorus, such as a phosphine group, are considered to have mainly a peroxide decomposition function (namely, a function of decomposing peroxide into a stable compound by self-oxidation of P atom).

Among these phosphorus-based functional groups, the phosphonic acid-based coloring inhibitor having the phosphonic acid group, is considered to be particularly suitable as a coloring inhibitor because it can efficiently capture the metal ions and is excellent in stability such as hydrolysis resistance.

As an example of the weather improver (B) of the present invention, a low molecular weight type phosphorus-based coloring inhibitor is used as the above-described phosphoric acid-based stabilizer used in combination with the phosphite compound, and the above-described phosphoric acid-based stabilizer used in combination with the hindered phenol-based stabilizer. Then, preferable specific examples of the low molecular weight type phosphorus-based coloring inhibitor include: phosphoric acid ($H_3PO_4$), triphenyl phosphite (($C_6H_5O)_3P$), trioctadecyl phosphite (($C_{18}H_{27}O)_3P$), Tridecyl phosphite (($C_{10}H_{21}O)_3P$), and trilauryl trithiophosphite ($[CH_3(CH_2)_{11}S]_3P$) etc.

As the above-described phosphoric acid-based stabilizer used in combination with the phosphite compound, and as the above-described phosphoric acid-based stabilizer used in combination with the hindered phenol-based stabilizer, the polymer type phosphorus-based coloring inhibitor can be used. Then, as preferable specific examples of the polymer type phosphorus-based coloring inhibitor, it is possible to use polymers such as polyvinyl phosphonic acid, polystyrene phosphonic acid, vinyl-based phosphoric acid (for example, a polymer such as acrylic phosphate ester ($CH_2$=CHCOOPO(OH)$_2$), vinyl alkyl phosphate ester ($CH_2$=CHR—O—PO(OH)$_2$, R is —(CH$_2$)n-)), and polyether sulfone resin, polyether ether ketone resin, linear phenol-formaldehyde resin, linear polystyrene resin, crosslinked polystyrene resin, a linear poly (trifluorostyrene) resin, crosslinked (trifluorostyrene) resin, poly (2,3-diphenyl-1,4-phenylene oxide) resin, poly (allyl ether ketone) resin, poly (arylene ether sulfone) resin, poly (phenylquinosanine) resin, poly (benzylsilane) resin, polystyrene-graft-ethylene tetrafluoroethylene resin, polystyrene-graft-polyvinylidene fluoride resin, and polystyrene-graft-tetrafluoroethylene resin, etc., into which the phosphonic acid group is introduced.

In the present invention, by using the phosphoric acid-based stabilizer in combination with the phosphite compound (addition form B2), or by using the phosphoric acid-based stabilizer in combination with the hindered phenol-based stabilizer (addition form B3) as the weather resistance improver, it is possible to enhance the effect of not only suppressing the influence of the ultraviolet energy which has been conventionally studied, but also suppressing the deterioration of the weather resistance of the polycarbonate resin composition containing the composite tungsten oxide fine particles caused by the heat generated when receiving sunlight and by the moisture and oxygen in the air.

However, an effect of the action and a process of the action by the weather resistance improver have not been clarified in many points, and details have not been clarified yet.

d) Sulfur-Based Stabilizer

Those containing the above-described phosphite compound and sulfur-based stabilizer (addition form B2), or those containing the above-described hindered phenol-based stabilizer and sulfur-based stabilizer (addition form B3), are also preferable as the weather resistance improver (B) in the polycarbonate resin composition containing the composite tungsten oxide fine particles (A), the polycarbonate resin (C), and the weathering resistance improver (B).

This is because according to the above-described addition form, the effect of enhancing the effect of suppressing the deterioration of the weather resistance can be obtained by the phosphite compound expressed by general formula (3)

and the hindered phenol type stabilizer, in the same manner as in the polycarbonate resin composition containing the composite tungsten oxide fine particles.

An example of the sulfur-based stabilizer includes a compound having divalent sulfur in a molecule. It can be considered that the sulfur-based stabilizer has mainly a peroxide decomposing function (namely, a function of decomposing peroxide into a stable compound by self-oxidation of S atom).

Suitable examples of the low molecular weight type sulfur-based stabilizer include: dilauryl thiodipropionate ($S(CH_2CH_2COOC_{12}H_{25})_2$), distearyl thiodipropionate ($S(CH_2CH_2COOC_{18}H_{37})_2$), Lauryl stearyl thiodipropionate ($S(CH_2CH_2COOC_{18}H_{37})$ $(CH_2CH_2COOC_{12}H_{25})$), dimyristyl thiodipropionate ($S(CH_2CH_2COOC_{14}H_{29})_2$), distearyl β, β'-thiodibutyrate ($S(CH(CH(CH_3) CH_2COOC_{18}H_{39})_2)$), and 2-mercaptobenzoimidazole ($C_6H_4NHNCSH$), dilauryl sulfide ($S(C_{12}H_{25})_2$), etc.

These sulfur-based stabilizers are considered to mainly have a peroxide decomposing function, and are considered to be particularly suitable as the coloring inhibitor.

In the present invention, by using those containing the phosphite compound and the sulfur-based stabilizer (addition form B2), or by using those containing the hindered phenol-based stabilizer and the sulfur-based stabilizer (addition form B3) as the weather resistance improver (B), it is possible to enhance the effect of not only suppressing the influence of the ultraviolet energy which has been conventionally studied, but also suppressing the deterioration of the weather resistance of the polycarbonate resin composition containing the composite tungsten oxide fine particles caused by the heat generated when receiving sunlight and by the moisture and oxygen in the air. However, an effect of the action and a process of the action by the weather resistance improver have not been clarified in many points, and details have not been clarified yet.

(3) Polycarbonate Resin (C)

The polycarbonate resin (C) used in the polycarbonate resin composition of the present invention is not particularly limited as long as it is a polycarbonate resin used in this field, and is produced by making a dihydric phenol react with a carbonate precursor.

Examples of a producing reaction include: an interfacial polymerization method, a melt transesterification method, solid phase transesterification of carbonate prepolymer, and a ring opening polymerization method of a cyclic carbonate compound, etc.

Typical examples of the dihydric phenol used for producing the polycarbonate resin (C) include: hydroquinone, resorcinol, 4,4'-biphenol, 1,1-bis (4-hydroxyphenyl) ethane, 2,2-bis (4-hydroxyphenyl) propane (commonly called bisphenol A), 2,2-bis (4-hydroxy-3-methylphenyl) propane, 2,2-bis (4-hydroxyphenyl) butane, 1,1-bis (4-hydroxyphenyl)-1-phenylethane, 1,1-bis (4-hydroxyphenyl) cyclohexane, 1,1-bis (4-hydroxyphenyl)-3,3,5-trimethylcyclohexane, 2,2-bis (4-hydroxyphenyl) pentane, 4,4'-(p-phenylenediisopropylidene) diphenol, 4,4'-(m-phenylenediisopropylidene) diphenol, 1,1-bis (4-hydroxyphenyl)-4-isopropylcyclohexane, bis (4-hydroxyphenyl) oxide, bis (4-hydroxyphenyl) sulfide, bis (4-hydroxyphenyl) sulfoxide, bis (4-hydroxyphenyl) sulfone, bis (4-hydroxyphenyl) ketone, bis (4-hydroxyphenyl) ester, 2,2-bis (3,5-dibromo-4-hydroxyphenyl) propane, bis (3,5-dibromo-4-hydroxyphenyl) sulfone, bis (4-hydroxy-3-methylphenyl) sulfide, 9,9-bis (4-hydroxyphenyl) fluorene and 9,9-bis (4-hydroxy-3-methylphenyl) fluorene, etc., and among them, bisphenol A is particularly preferable from the viewpoint of impact resistance.

As the carbonate precursor, carbonyl halide, carbonic acid diester, or haloformate, etc., can be used. Specifically, phosgene, diphenyl carbonate or a dihaloformate of a dihydric phenol can be used.

Here, a method for producing the polycarbonate resin (C) will be briefly described by way of example of (a) interfacial polymerization method and (b) melt transesterification method, and (c) properties of the obtained polycarbonate resin.

(a) Interfacial Polymerization Method

In order to produce the polycarbonate resin (C) by polymerizing the dihydric phenol and the carbonate precursor by the interfacial polymerization method, a catalyst, a terminal stopper, an antioxidant for preventing the oxidation of the dihydric phenol, or the like may be used if necessary.

The polycarbonate resin (C) used in the polycarbonate resin composition of the present invention, includes: branched polycarbonate resin obtained by copolymerizing a polyfunctional aromatic compound having three or more functional groups, polyester carbonate resin obtained by copolymerizing aromatic or aliphatic (including alicyclic) difunctional carboxylic acid, copolymerized polycarbonate resin obtained by copolymerizing bifunctional alcohol (including cycloalkyl), and polyester carbonate resin obtained by copolymerizing the bifunctional carboxylic acid and the bifunctional alcohol together, or may be a mixture of two or more produced polycarbonate resins.

Examples of the polyfunctional aromatic compound having three or more functional groups include: phloroglucin, phloroglucide, or trisphenol such as 4,6-dimethyl-2,4,6-tris (4-hydroxydiphenyl) heptene-2, 2,4,6-trimethyl-2,4,6-tris (4-hydroxyphenyl) heptane, 1,3,5-tris (4-hydroxyphenyl) benzene, 1,1,1-tris (4-hydroxyphenyl) ethane, 1,1,1-tris (3,5-dimethyl-4-hydroxyphenyl) ethane, 2,6-bis (2-hydroxy-5-methylbenzyl)-4-methylphenol, 4-{4-[1,1-bis (4-hydroxyphenyl) ethyl] benzene}-α,α-dimethylbenzyl-phenol, tetra (4-hydroxyphenyl) methane, bis (2,4-dihydroxyphenyl) ketone, 1,4-bis (4,4-dihydroxytriphenylmethyl) benzene, or trimellitic acid, pyromellitic acid, benzophenonetetracarboxylic acid and acid chlorides thereof, and among them, 1,1,1-tris (4-hydroxyphenyl) ethane, and 1,1,1-tris (3,5-dimethyl-4-hydroxyphenyl) ethane can be preferably used, and particularly 1,1,1-tris (4-hydroxyphenyl) ethane or the like can be preferably used.

In the case of containing the polyfunctional compound generating the branched polycarbonate, an amount thereof is 0.001 to 1 mol %, preferably 0.005 to 0.9 mol %, and particularly preferably 0.01 to 0.8 mol %, based on the total amount of the aromatic polycarbonate. Particularly, in the case of the melt transesterification method, a branched structure may occur as a side reaction, but the amount of the branched structure is also 0.001 to 1 mol %, preferably 0.005 to 0.9 mol %, and particularly preferably 0.01 to 0.8 mol %, based on the total amount of the aromatic polycarbonate. Note that the above proportion can be calculated using a measurement by proton NMR.

The aliphatic difunctional carboxylic acid is preferably a, ω-dicarboxylic acid. Examples of the aliphatic difunctional carboxylic acid include: preferably linear saturated aliphatic dicarboxylic acid such as sebacic acid (decanedioic acid), dodecanedioic acid, tetradecanedioic acid, octadecanedioic acid, and icosanedioic acid, and alicyclic dicarboxylic acid such as cyclohexane dicarboxylic acid. Examples of the difunctional alcohol include: preferably alicyclic diol, and for example cyclohexanedimethanol, cyclohexanediol, and tricyclodecanedimethanol can be used.

Further, polycarbonate-polyorganosiloxane copolymers copolymerized with polyorganosiloxane unit can also be used.

The reaction by the interfacial polymerization method is usually a reaction between dihydric phenol and phosgene, in the presence of an acid binder and an organic solvent. As the acid binder, for example, alkali metal hydroxides such as sodium hydroxide and potassium hydroxide, and pyridine, etc., can be used.

As the organic solvent, for example, halogenated hydrocarbons such as methylene chloride, and chlorobenzene, etc., can be used.

Further, for accelerating the reaction, for example, a catalyst such as a tertiary amine or a quaternary ammonium salt can be used, and as a molecular weight regulator, for example, it is preferable to use monofunctional phenols such as phenol, and p-tert-butylphenol, p-cumylphenol, etc.

Further, as the monofunctional phenols, decyl phenol, dodecyl phenol, tetradecyl phenol, hexadecyl phenol, octadecyl phenol, eicosylphenol, and docosylphenol, triacontyl phenol, etc., can be used. These monofunctional phenols having relatively long chain alkyl groups are effective when improvement in fluidity and hydrolysis resistance is required.

The reaction temperature is usually 0 to 40° C., the reaction time is preferably several minutes to 5 hours, and the pH during the reaction is usually preferably 10 or more.

(b) Melt Transesterification Method

The reaction by the melt transesterification method is usually an ester exchange reaction between the dihydric phenol and carbonate ester, and is performed by a method of mixing the dihydric phenol and the carbonate ester while heating in the presence of an inert gas to distill out alcohol or phenol to be produced. The reaction temperature varies depending on a boiling point of the alcohol or the phenol to be produced, but it is usually in a range of 120 to 350° C. At a latter stage of the reaction, the system is reduced to about 10 to 0.1 Torr to facilitate distillation of the alcohol or the phenol to be produced.

Examples of the carbonate ester include esters such as an aryl group having 6 to 10 carbon atoms, an aralkyl group, or an alkyl group having 1 to 4 carbon atoms, which may be substituted. Specifically, diphenyl carbonate, ditolyl carbonate, bis (chlorophenyl) carbonate, m-cresyl carbonate, dinaphthyl carbonate, bis (diphenyl) carbonate, dimethyl carbonate, diethyl carbonate, and dibutyl carbonate, etc., can be used. Among them, diphenyl carbonate is preferable.

Further, a polymerization catalyst can be used to increase a polymerization rate, and as such a polymerization catalyst, for example, alkali metal compounds such as sodium hydroxide, potassium hydroxide, sodium salt and potassium salt of dihydric phenol, alkaline earth metal compounds such as calcium hydroxide, barium hydroxide and magnesium hydroxide, nitrogen-containing basic compounds such as tetramethylammonium hydroxide, tetraethylammonium hydroxide, trimethylamine, and triethylamine, alkoxides of alkali metals and alkaline earth metals, organic acid salts of alkali metals and alkaline earth metals, catalysts usually used in the esterification reaction and the transesterification reaction, such as zinc compounds, boron compounds, aluminum compounds, silicon compounds, germanium compounds, organotin compounds, lead compounds, osmium compounds, antimony compounds, manganese compounds, titanium compounds, zirconium compounds, can be used. The catalysts may be used alone or in combination of two or more. The amount of these polymerization catalysts to be used is selected in a range of preferably $1 \times 10^{-8}$ to $1 \times 10^{-3}$ equivalent, more preferably $1 \times 10^{-7}$ to $5 \times 10^{-4}$ equivalent, per 1 mol of the raw material dihydric phenol.

Further, in order to reduce phenolic terminal groups in such a polymerization reaction, for example, compounds such as bis (chlorophenyl) carbonate, bis (bromophenyl) carbonate, bis (nitrophenyl) carbonate, bis (phenylphenyl) carbonate, chlorophenyl phenyl carbonate, bromophenyl phenyl carbonate, nitrophenyl phenyl carbonate, phenyl carbonate, methoxy carbonyl phenyl carbonate and ethoxy carbonyl phenyl carbonate, are preferably added at the latter stage or after the end of the polycondensation reaction. Among them, 2-chlorophenylphenyl carbonate, 2-methoxycarbonyl phenyl carbonate, and 2-ethoxycarbonylphenyl phenyl carbonate are preferable, and particularly 2-methoxycarbonylphenyl phenyl carbonate is preferably used.

(C) Properties of the Polycarbonate Resin

A viscosity average molecular weight of the polycarbonate resin (C) is 14,000 to 100,000, preferably 20,000 to 30,000, more preferably 22,000 to 28,000, and still more preferably 23,000 to 26,000.

In the above-described preferable range, by having a molecular weight sufficient for resistance to a hard coating agent, the resin composition of the present invention can reduce uneven shading of a molded product caused by disturbance of a resin flow, and can form a good polycarbonate resin molded body having a hard coat layer. In an even more preferable range, both impact resistance and molding processability are excellent. Note that the above-described polycarbonate resin may be the one obtained by mixing those having a viscosity average molecular weight out of the above range.

A method for obtaining the viscosity average molecular weight (M) of the polycarbonate resin (C) will be described.

First, a value of a specific viscosity ($\eta_{sp}$) calculated by formula (4) is obtained from a solution in which 0.7 g of polycarbonate is dissolved in 100 ml of methylene chloride at 20° C., using an Ostwald viscometer.

$$\eta_{sp}=(t-t_0)/t_0 \qquad \text{Formula (4)}$$

(t0 indicates the number of dropping seconds of the methylene chloride, and t indicates the dropping seconds of the sample solution).

A value of the obtained specific viscosity ($\eta_{sp}$) is inserted into the formula (5).

$$\eta_{sp}/c=[\eta]+0.45 \times [\eta]^2 c \qquad \text{Formula (5)}$$

(Wherein [η] is the intrinsic viscosity)

[i]=$1.23 \times 10^{-4}$ $M^{0.83}$ c=0.7 g/dl (4) Method for Producing Polycarbonate Resin Composition The polycarbonate resin composition of the present invention contains the composite tungsten oxide fine particles (A), the polycarbonate resin (C) and the weather resistance improver (B), and the method for producing the polycarbonate resin composition is not particularly limited, and for example, the following methods are used:

a) a method of mixing the composite tungsten oxide fine particles (A) and the weather resistance improver (B) during the polymerization reaction of the polycarbonate resin (C) or at the end of the polymerization reaction:

b) a method of mixing the composite tungsten oxide fine particles (A) and the weather resistance improver (B) while the polycarbonate resin (C) is melted, for example during the kneading of the polycarbonate resin (C); and c) a method of mixing the composite tungsten oxide fine particles (A) and the weather resistance improver (B) in a state in which the polycarbonate resin (C) is in a solid state like pellets and then melting and kneading the mixture using an extruder or the like.

The composite tungsten oxide fine particles (A) component of the present invention can be blended alone in the polycarbonate resin (C) by themselves, but may be surface-treated with various surface treating agents or surfactants and blended in the polycarbonate resin (C) in a state of a mixture with the agent, in order to improve the dispersibility in the resin.

Further, the composite tungsten oxide fine particles (A) component preferably contain at least one or two or more metal oxides, metal nitrides, metal carbides (sometimes referred to as A'component hereafter) selected from the group of Si, Zr, Ti and Al, in an amount of 0.0001 to 0.1 parts by weight per 100 parts by weight of the polycarbonate resin (C). The composite tungsten oxide fine particles (A) component is blended in the polycarbonate resin (C) in a state of a mixture with the A'component. It is preferable that the mixing is carried out in water or an organic solvent, particularly in alcohol. Acid or alkali for pH adjustment, a surfactant, a coupling agent and the like may be added to the mixed solution. Various mills such as a beads mill, a ball mill and a sand mill, and an ultrasonic mixers, etc. can be used in the mixing. A thermosetting resin is preferable as a resin binder used for the above mixing, and an epoxy resin is particularly preferable. This is because the epoxy resin is excellent in compatibility with the polycarbonate resin, has little adverse effect on transparency and less aggressiveness against the polycarbonate resin.

(5) Heat Ray Shielding Molded Body

The heat ray shielding molded body of the present invention is a molded body formed in such a way that the polycarbonate resin composition containing the composite tungsten oxide fine particles (A), the polycarbonate resin (C) and the weather resistance improver (B), is diluted and melt-kneaded with a polycarbonate resin (C) or a different thermoplastic resin compatible with the polycarbonate resin (C), and thereafter molded into a predetermined shape.

As a method for molding the heat ray shielding molded body, a method such as injection molding, extrusion molding, compression molding, rotational molding or the like can be used. Particularly, the injection molding and the extrusion molding are preferable because a desired shape can be molded by them.

(a) Extrusion Molding and (b) Injection Molding are Briefly Described Hereafter.

(a) Extrusion Molding

As a method for obtaining a plate-like (sheet-like) or film-like molded body by an extrusion molding method, a method of taking out a molten acrylic resin extruded using an extruder such as a T die while being cooled by a cooling roll is adopted. A molding temperature varies depending on a composition etc., of a polycarbonate resin molding material to be used, but in order to obtain sufficient fluidity, the temperature is increased to 50 to 150° C. higher than a melting point or a glass transition temperature of the resin. For example, the temperature is set to 200° C. or more, preferably 240° C. to 330° C. When the temperature is 200° C. or more, viscosity peculiar to the polymer can be lowered, and the composite tungsten oxide fine particles (A) can be uniformly dispersed in the polycarbonate resin (C), which is preferable. When the temperature is lower than 350° C., the polycarbonate resin (C) is not decomposed and is not deteriorated, which is preferable.

(B) Injection Molding

As a method for obtaining the molded body of the present invention by an injection molding method, injection compression molding, injection press molding, heat insulating mold molding, rapid heating and cooling mold molding, ultra high speed injection molding and the like can also be used, in addition to the usual injection molding method. Among them, the injection press molding is preferable because of the following reasons. Both cold runner method and hot runner method can be selected for molding.

In the present invention, the "injection press molding" is a molding method of supplying a molten thermoplastic resin into a mold cavity having a capacity larger than a target molded product capacity at least at the time of supplying a molten thermoplastic resin, and reducing the capacity of the mold cavity to the capacity of a target molded product after completion of the supply, and taking out the molded product after cooling the molded product in the mold cavity to a temperature at which it can be taken out. Note that the reduction of capacity of the mold cavity may be started either before or after the supply of the resin is completed, but it is preferable to start before the supply is completed. Namely, it is preferable that the step of reducing the capacity of the cavity and the step of filling the resin is overlapped each other.

In the injection press molding, it is possible to reduce the need to fill the resin with high pressure, and therefore distortion in the molded product is reduced. Due to the reduction of the distortion, the resistance of the molded product to the hard coat agent is improved. By improving the resistance, it is possible to apply a hard coat agent having high adhesion. Further, due to a resin inflow under low pressure, the probability of generating an irregular resin flow is reduced, and uneven shading of the molded product due to the irregular resin flow is also easily reduced.

From a viewpoint of reducing the distortion of a surface of the molded product, it is also preferable to combine insulating mold molding and rapid heating/cooling mold molding (halogen lamp irradiation, induction heating, high-speed switching of heat medium, and ultrasonic mold, etc.).

Further, as is commonly known in the injection press molding, molding under extremely low pressure is possible, and therefore it is possible to greatly reduce a level of clamping pressure of an injection molding machine. Particularly in a large-sized molded product, and in the molded product having a long flowing length, the quality of the product can be improved and the equipment cost can be reduced.

From another point of view, the injection press molding is a molding method capable of reducing the molding temperature. Therefore, according to this molding method, a heat load of the large-sized molded product can be reduced, and as a result, it is possible to provide a good molded product.

In the above-described injection press molding, particularly in the injection press molding of the large-sized molded product, it is important to maintain the degree of parallelism between the molds in an intermediate mold clamping state, in an intermediate mold clamping state and in a final mold clamping state. A more uniform pressure load on the resin in the mold can be achieved by maintaining the parallelism between the molds. As a result, it is sufficient to apply a low pressure on the resin as a whole, thereby making it possible to provide the molded product with less distortion.

Suitable examples of a method for maintaining the above-mentioned parallelism between the molds, include: (i) a method for maintaining the degree of parallelism between the molds while adjusting the parallelism between the molds by a mold clamping mechanism at a plurality of locations, preferably at four corner portions on a mold mounting plate, (ii) a method for maintaining the degree of parallelism between the molds while adjusting the parallelism between the molds by applying a corrective force to a plurality of places, preferably four corners, on the mold mounting plate (mold attaching face).

The polycarbonate resin composition used in the present invention has reduced distortion of the molded product even in a large-sized injection molded product and is suitable for a large-sized injection molded body.

(6) Heat Ray Shielding Lamination Body

In the heat ray shielding lamination body of the present invention, the heat ray shielding molded body is laminated on other transparent molded body. The heat ray shielding lamination body itself can be used as roofing materials of buildings, wall materials, window materials used for openings of automobiles, trains, and aircraft, etc., arcades, ceiling domes, and carports etc.

Further, the heat ray shielding lamination body can also be used as a structural material as an integrated transparent heat ray shielding lamination body in which the heat ray shielding molded body of the present invention is laminated on a transparent molded body by an arbitrary method, using inorganic glass, resin glass, resin film or the like, as other transparent molded body. For example, the heat ray shielding lamination body having a heat ray shielding function and a scattering prevention function can be obtained by integrally laminating a polycarbonate resin heat ray shielding molded body previously formed into a film shape, on the inorganic glass by a heat laminating method.

Further, it is also possible to obtain the heat ray shielding lamination body by integrally laminating it on other transparent molded body by the heat laminating method, coextrusion method, press molding method, injection molding method or the like, simultaneously with the molding of the heat ray shielding molded body. The above-described heat ray shielding lamination body can be used as a more useful structural material by effectively compensating mutual defects while effectively exhibiting the advantages of mutual molded bodies.

EXAMPLES

The present invention will be described in more detail hereafter, with reference to examples. Note that the present invention is not limited by the following examples at all.

[Raw Material]

The raw materials used in this example will be explained in an order of (1) composite tungsten oxide fine particles (A), (2) weather resistance improver (B), and (3) polycarbonate resin (C).

(1) Composite Tungsten Oxide Fine Particles (A)

$Cs_{0.33}WO_3$ fine particle dispersion body ($Cs_{0.33}WO_3$ fine particle content: 20 mass %) (produced by Sumitomo Metal Mining Co., Ltd.) was used as the composite tungsten oxide fine particles.

(2) Weather Improver (B)

6-[3-(3-tert-butyl-4-hydroxy-5-methylphenyl) propoxy]-2,4,8,10-tetra-tert-butyl dibenzyl [d, f][1,3,2] dioxyphosphopin (Sumilizer (registered trademark) GP (referred to as "weather improver" Ba "in this example)) produced by Sumitomo Chemical Co., Ltd. was used.

As a hindered phenol-based stabilizer, pentaerythritol tetrakis [3-(3,5-di-tert-butyl-4-hydroxyphenyl) propionate (produced by BASF, trade name Irganox (registered trademark) 1010, (it is described as a weather resistance improver "Bb" in this example)) was used.

As a phosphoric acid-based stabilizer, tris (2,4-tert-butylphenyl) phosphite (trade name Adekastab (registered trademark) AS2112 (produced by ADEKA Corporation, referred to as "weatherability improver" Bc" hereafter.)) was used.

As a sulfur-based stabilizer, dimyristyl (3,3'-thiodipropionate), (trade name Sumilizer (registered trademark) TPM (produced by Sumitomo Chemical Co., Ltd., which is described as weather improver "Bd" in this example.)) was used.

(3) Polycarbonate Resin (C)

As the polycarbonate resin, polycarbonate resin pellets (produced by Bayer, trade name Macrolon (registered trademark) AL 2647) was used.

[Evaluation Method]

In evaluating the optical properties of the heat ray shielding molded body obtained in this example, haze H (%) was measured in accordance with JIS K 7136 using a haze meter (manufactured by Murakami Color Research Laboratory). Further, the visible light transmittance T (%) and the solar radiation transmittance ST (%) were measured in accordance with JIS R 3106 using a spectrophotometer U-4000 (manufactured by Hitachi Ltd.).

Example 1

A Case in which the Weather Improver (B) is Added in Addition Form B1

100 parts by weight of polycarbonate resin pellets, 0.15 parts by weight of composite tungsten oxide fine particles, and 0.75 parts by weight of weather resistance improver (Ba) were uniformly mixed, then a mixture was melt-kneaded at 290° C. using a twin-screw extruder (manufactured by Toyo Seiki Seisaku-Sho, Ltd.), and an extruded strand having a diameter of 3 mm was cut to obtain pellets.

The obtained pellets and polycarbonate resin pellets were weighed, adjusted so that the content of the composite tungsten oxide fine particles was 0.05 mass %, then mixed uniformly to obtain a mixture. The mixture was charged in an injection molding machine (manufactured by Toyo Seiki Seisaku-sho, Ltd.) and injection-molded to obtain a sheet-like molded body of example 1 having a size of 10 cm×5 cm and a thickness of 2.0 mm.

Haze H (%), visible light transmittance T (%), and solar radiation transmittance ST (%) were evaluated as optical properties of the sheet-like molded body of example 1. The evaluation results are shown in Table 1.

Further, the sheet-like molded body of example 1 was retained in an air bath at a 120° C. for 30 days, and thereafter haze H (%), visible light transmittance (%), and solar radiation transmittance ST (%) were evaluated as optical properties. The evaluation results are shown in Table 1.

Example 2

The Case in which the Weather Improver (B) is Added in Addition Form B1

A sheet-like molded body of example 2 was obtained in the same manner as in example 1 except that the addition amount of the weather resistance improver (Ba) was changed to 0.015 parts by weight.

Then, the optical properties of the sheet-like molded body of example 2 were evaluated in the same manner as in example 1. The evaluation results are shown in Table 1.

Example 3

The Case in which the Weathering Resistance Improver (B) is Added in Addition Form B1

A sheet-like molded body of example 3 was obtained in the same manner as in example 1 except that the addition amount of the weather resistance improver (Ba) was changed to 3.0 parts by weight.

Then, the optical properties of the sheet-like molded body of example 3 were evaluated in the same manner as in example 1. The evaluation results are shown in Table 1.

Example 4

The Case in which the Weather Improver (B) is Added in Addition Form B2

The same operation as in example 1 was performed except that the addition amount of the weather resistance improver (Ba) was changed to 0.75 parts by weight and the addition amount of (Bb) was changed to 0.75 parts by weight, to obtain the sheet-like molded body of example 4.

Then, the optical properties of the sheet-like molded body of example 4 were evaluated in the same manner as in example 1. The evaluation results are shown in Table 1.

Example 5

The Case in which the Weather Resistance Improver (B) is Added in Addition Form B2

The same operation as in example 1 was performed except that the addition amount of the weather resistance improver (Ba) was changed to 0.75 parts by weight and the addition amount of (Bc) was changed to 0.75 parts by weight, to obtain the sheet-like molded body of example 5.

Then, the optical properties of the sheet-like molded body of example 5 were evaluated in the same manner as in example 1. The evaluation results are shown in Table 1.

Example 6

The Case in which the Weather Improver (B) is Added in Addition Form B2

The same operation as in example 1 was performed except that the addition amount of the weather resistance improver (Ba) was changed to 0.75 parts by weight and the addition amount of (Bd) was changed to 0.75 parts by weight, to obtain the sheet-like molded body of example 6.

Then, the optical properties of the sheet-like molded body of example 6 were evaluated in the same manner as in example 1. The evaluation results are shown in Table 1.

Example 7

The Case in which the Weather Improver (B) is Added in Addition Form B2

The same operation as in example 1 was performed except that the addition amount of the weather resistance improver (Ba) was changed to 1.5 parts by weight and the addition amount of (Bc) was changed to 0.25 parts by weight, to obtain the sheet-like molded body of example 7.

Then, the optical properties of the sheet-like molded body of example 7 were evaluated in the same manner as in example 1. The evaluation results are shown in Table 1.

Example 8

The Case in which the Weather Resistance Improver (B) is Added in Addition Form B3

The same operation as in example 1 was performed except that the addition amount of the weather resistance improver (Bb) was changed to 0.75 parts by weight and the addition amount of (Bc) was changed to 0.75 parts by weight, to obtain the sheet-like molded body of example 8.

Then, the optical properties of the sheet-like molded body of example 8 were evaluated in the same manner as in example 1. The evaluation results are shown in Table 1.

Example 9

The Case in which the Weather Resistance Improver (B) is Added in Addition Form B3

The same operation as in example 1 was performed except that the addition amount of the weather resistance improver (Bb) was changed to 0.01 parts by weight and the addition amount of (Bc) was changed to 0.005 parts by weight, to obtain the sheet-like molded body of example 9.

Then, the optical properties of the sheet-like molded body of example 9 were evaluated in the same manner as in example 1. The evaluation results are shown in Table 1.

Example 10

The Case in which the Weather Resistance Improver (B) is Added in Addition Form B3

The same operation as in example 1 was performed except that the addition amount of the weather resistance improver (Bb) was changed to 2.25 parts by weight and the addition amount of (Bc) was changed to 0.75 parts by weight, to obtain the sheet-like molded body of example 10.

Then, the optical properties of the sheet-like molded body of example 10 were evaluated in the same manner as in example 1. The evaluation results are shown in Table 1.

Example 11

The Case in which the Weather Resistance Improver (B) is Added in Addition Form B3

The same operation as in example 1 was performed except that the addition amount of the weather resistance improver (Bb) was changed to 0.75 parts by weight and the addition amount of (Bd) was changed to 0.75 parts by weight, to obtain the sheet-like molded body of example 11.

Then, the optical properties of the sheet-like molded body of example 11 were evaluated in the same manner as in example 1. The evaluation results are shown in Table 1.

Example 12

The Case in which the Weather Resistance Improver (B) is Added in Addition Form B3

The same operation as in example 1 was performed except that the addition amount of the weather resistance improver (Bb) was changed to 1.5 parts by weight and the addition amount of (Bd) was changed to 0.25 parts by weight, to obtain the sheet-like molded body of example 12.

Then, the optical properties of the sheet-like molded body of example 12 were evaluated in the same manner as in example 1. The evaluation results are shown in Table 1.

Comparative Example 1

The same operation as in example 1 was performed except that the weather resistance improver (B) was not added, to obtain the sheet-like molded body of comparative example 1.

Then, the optical properties of the sheet-like molded body of comparative example 1 were evaluated in the same manner as in example 1. The evaluation results are shown in Table 1.

Comparative Example 2

The same operation as in example 1 was performed except that only (Bb) was used as the weather resistance improver (B), and the addition amount thereof was set to 0.75 parts by weight, to obtain the sheet-like molded body of comparative example 2.

Then, the optical properties of the sheet-like molded body of comparative example 2 were evaluated in the same manner as in example 1. The evaluation results are shown in Table 1.

Comparative Example 3

The same operation as in example 1 was performed except that only (Bc) was used as the weather resistance improver (B), and the addition amount thereof was set to 0.75 parts by weight, to obtain the sheet-like molded body of comparative example 3.

Then, the optical properties of the sheet-like molded body of comparative example 3 were evaluated in the same manner as in example 1. The evaluation results are shown in Table 1.

Comparative Example 4

The same operation as in example 1 was performed except that only (Bd) was used as the weather resistance improver (B), and the addition amount thereof was set to 0.75 parts by weight, to obtain the sheet-like molded body of comparative example 4.

Then, the optical properties of the sheet-like molded body of comparative example 4 were evaluated in the same manner as in example 1. The evaluation results are shown in Table 1.

(Summary of the Evaluation Results)

From the results shown in Table 1, it is found that the molded bodies of examples 1 to 3 obtained by adding 0.1 to 20 parts by weight of the phosphite compound (addition form B1) as the weather resistance improver of the present invention, based on 1 parts by weight of the composite tungsten oxide fine particles, show excellent visible light transmittance, solar radiation transmittance and haze during molding. It is also found that the optical properties after being retained in the air bath at 120° C. for 30 days shows no change in the visible light transmittance, the solar radiation transmittance and the haze.

Accordingly, it is found that the phosphite compound (addition form B1) as a weather resistance improver is capable of suppressing the deterioration of the infrared shielding function over time due to deterioration of the weather resistance of the composite tungsten oxide fine particles when the polycarbonate resin composition containing the composite tungsten oxide fine particles is influenced by the heat generated when receiving sunlight, and influenced by the moisture or the oxygen in the air.

Further, it is also found that the optical properties after being retained in the air bath at 120° C. for 30 days show no change in the visible light transmittance, the solar radiation transmittance and the haze in example 4, example 5, example 6, and example 7 in the same manner as in the above-described examples 1 to 3, wherein in example 4, the phosphite compound and the hindered phenol-based stabilizer are added, in example 5, the phosphite compound and the phosphoric acid-based stabilizer are added, in example 6, the phosphite compound and the sulfur-based stabilizer are added, and in example 7, the phosphoric acid-based stabilizer and the sulfur-based stabilizer are added, which are embodiments of those containing the phosphite compound and one or more kinds selected from the hindered phenol-based stabilizer, the phosphoric acid-based stabilizer and the sulfur-based stabilizer as the weather resistance improver.

As a result, it is also found that the phosphite compound, the hindered phenol-based stabilizer, the phosphoric acid-based stabilizer and the sulfur-based stabilizer can be used in combination as the weather resistance improver.

Further, it is also found that the optical properties after being retained in the air bath at 120° C. for 30 days in the same manner as in the above-described examples 1 to 3, show no change in the visible light transmittance, the solar radiation transmittance and the haze in examples 8 to 10, example 11, and example 12, which are embodiments of those containing the hindered phenol-based stabilizer and one or more kinds selected from the phosphoric acid-based stabilizer and the sulfur-based stabilizer as the weather resistance improver, wherein in examples 8 to 10, the hindered phenol-based stabilizer and the phosphoric acid-based stabilizer are added, in example 11, the hindered phenol-based stabilizer and the sulfur-based stabilizer are added, and in example 12, the hindered phenol-based stabilizer, the phosphoric acid-based stabilizer, and the sulfur-based stabilizer are added (addition form B3).

As a result, it is also found that the hindered phenol-based stabilizer, the phosphoric acid-based stabilizer, and the sulfur-based stabilizer can be used in combination as the weather resistance improver.

In contrast, comparative example 1 shows a conventional molded body in which the composite tungsten oxide fine particles are uniformly dispersed in the polycarbonate resin without adding the weather resistance improver.

The initial optical properties of the molded body of comparative example 1 show excellent visible light transmittance, solar radiation transmittance and haze. However, it is found that the optical properties after being retained in the air bath at 120° C. for 30 days show as follows: the solar radiation transmittance is greatly increased and the visible light transmittance is also increased and an infrared shielding performance is greatly deteriorated.

Further, in comparative example 2, comparative example 3, and comparative example 4, the initial optical properties of the molded body show excellent visible light transmittance, solar radiation transmittance and haze, wherein in comparative example 2, only hindered phenol-based stabilizer is added, in comparative example 3, only phosphoric acid-based stabilizer is added, and in comparative example 4, only sulfur-based stabilizer is added. However, it is found that the optical properties after being retained in the air bath at 120° C. for 30 days show as follows: the solar radiation transmittance is greatly increased and the visible light transmittance is also increased and the infrared shielding performance is greatly deteriorated, in the same manner as in comparative example 1, and further the haze is slightly increased in comparative example 4.

From this result, it can be considered that when the hindered phenol-based stabilizer, the phosphoric acid-based stabilizer and the sulfur-based stabilizer are added alone, it is difficult to suppress the deterioration of the weather resistance of the infrared shielding material fine particles, which is caused under the influence of the heat generated when receiving sunlight, and under the influence of the moisture and oxygen in the air.

TABLE 1

Composition of composite tungsten oxide fine particle-dispersed polycarbonate resin composition

| | Polycarbonate resin (pts. wt.) | Composite tungsten oxide (pts. wt.) | Weather resistance improver | | | | | | | | |
|---|---|---|---|---|---|---|---|---|---|---|---|
| | | | Phosphate-base | | Hindered phenol-base | | Phosphoric acid-base | | Sulfur-base | | |
| | | | Addition form | Kind | Addition amount (pts. wt.) | Kind | Addition amount (pts. wt.) | Kind | Addition amount (pts. wt.) | Kind | Addition amount (pts. wt.) |
| Example 1 | 100 | 0.15 | B1 | Ba | 0.75 | — | — | — | — | — | — |
| Example 2 | 100 | 0.15 | B1 | Ba | 0.015 | — | — | — | — | — | — |
| Example 3 | 100 | 0.15 | B1 | Ba | 3.0 | — | — | — | — | — | — |
| Example 4 | 100 | 0.15 | B2 | Ba | 0.75 | Bb | 0.75 | — | — | — | — |
| Example 5 | 100 | 0.15 | B2 | Ba | 0.75 | — | — | Bc | 0.75 | — | — |
| Example 6 | 100 | 0.15 | B2 | Ba | 0.75 | — | — | — | — | Bd | 0.75 |
| Example 7 | 100 | 0.15 | B2 | Ba | 1.5 | — | — | Bc | 0.25 | Bd | 0.25 |
| Example 8 | 100 | 0.15 | B3 | — | — | Bb | 0.75 | Bc | 0.75 | — | — |
| Example 9 | 100 | 0.15 | B3 | — | — | Bb | 0.01 | Bc | 0.005 | — | — |
| Example 10 | 100 | 0.15 | B3 | — | — | Bb | 2.25 | Bc | 0.75 | — | — |
| Example 11 | 100 | 0.15 | B3 | — | — | Bb | 0.75 | — | — | Bd | 0.75 |
| Example 12 | 100 | 0.15 | B3 | — | — | Bb | 1.5 | Bc | 0.25 | Bd | 0.25 |
| Comparative Example 1 | 100 | 0.15 | — | — | — | — | — | — | — | — | — |
| Comparative Example 2 | 100 | 0.15 | — | — | — | Bb | 0.75 | — | — | — | — |
| Comparative Example 3 | 100 | 0.15 | — | — | — | — | — | Bc | 0.75 | — | — |
| Comparative Example 4 | 100 | 0.15 | — | — | — | — | — | — | — | Bd | 0.75 |

| | Molded body | | | | | |
|---|---|---|---|---|---|---|
| | Optical properties | | | | | |
| | | before being retained in the air bath at 120° C. | | | After being retained in the air bath at 120° C. | |
| | Composite tungsten oxide content (mass %) | Visible light transmittance (%) | Solar radiation transmittance (%) | Haze (%) | Visible light transmittance (%) | Solar radiation transmittance (%) | Haze (%) |
| Example 1 | 0.05 | 70.9 | 38.6 | 1.2 | 71.3 | 39.1 | 1.3 |
| Example 2 | 0.05 | 71.2 | 39.0 | 1.3 | 71.7 | 39.6 | 1.5 |
| Example 3 | 0.05 | 71.1 | 38.8 | 1.3 | 71.7 | 39.6 | 1.4 |
| Example 4 | 0.05 | 70.2 | 37.7 | 1.5 | 70.9 | 38.6 | 1.6 |
| Example 5 | 0.05 | 71.5 | 39.3 | 1.4 | 72.3 | 40.4 | 1.5 |
| Example 6 | 0.05 | 70.5 | 38.1 | 1.4 | 71.1 | 38.8 | 1.6 |
| Example 7 | 0.05 | 71.2 | 39.2 | 1.4 | 71.9 | 40.1 | 1.5 |
| Example 8 | 0.05 | 71.5 | 37.4 | 1.5 | 72.6 | 38.2 | 1.5 |
| Example 9 | 0.05 | 70.3 | 36.6 | 1.4 | 71.1 | 37.2 | 1.5 |
| Example 10 | 0.05 | 72.1 | 37.9 | 1.3 | 72.7 | 38.3 | 1.3 |
| Example 11 | 0.05 | 71.2 | 37.2 | 1.2 | 71.7 | 37.6 | 1.2 |
| Example 12 | 0.05 | 70.5 | 37.1 | 1.3 | 71.7 | 37.8 | 1.5 |
| Comparative Example 1 | 0.05 | 69.7 | 37.0 | 1.2 | 75.8 | 44.9 | 1.3 |
| Comparative Example 2 | 0.05 | 70.2 | 37.7 | 1.3 | 74.7 | 43.4 | 1.4 |
| Comparative Example 3 | 0.05 | 70.9 | 38.6 | 1.4 | 75.9 | 45.0 | 1.5 |
| Comparative Example 4 | 0.05 | 71.0 | 38.7 | 1.3 | 77.7 | 47.3 | 1.6 |

DESCRIPTION OF SIGNS AND NUMERALS

11: An octahedron formed by units of $WO_6$.
12: Melement disposed in a hexagonal space (tunnel) formed by assembling six octahedrons formed by units of $WO_6$.

The invention claimed is:

1. A polycarbonate resin composition containing a composite tungsten oxide fine particle (A), a weather resistance improver (B), and a polycarbonate resin (C),
   wherein the composite tungsten oxide fine particle (A) is the composite tungsten oxide fine particle expressed by a general formula $M_xWO_y$ (wherein M element is one or more elements selected from Cs, Rb, K, Tl, In, Ba, Li, Ca, Sr, Fe, Sn, Al, Cu, and Na, W is tungsten, O is oxygen, satisfying $0.1 \leq x \leq 0.5$, $2.2 \leq y \leq 3.0$), and
   the weather resistance improver (B) is either (1) a phosphite compound and a phosphoric acid-based stabilizer, or (2) a phosphite compound, a phosphoric acid-based stabilizer,
   and one or more kinds selected from a hindered phenol-based stabilizer, and a sulfur-based stabilizer,
   wherein a structure of the phosphite compound is expressed by a general formula (3),

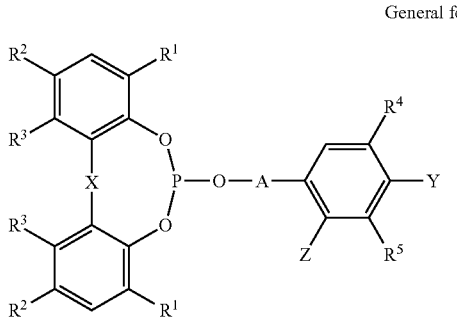

General formula (3)

wherein in (the general formula (3), $R^1$, $R^2$, $R^4$ and $R^5$ each independently indicates a hydrogen atom, an alkyl group having 1 to 8 carbon atoms, a cycloalkyl group having 5 to 12 carbon atoms, an alkyl cycloalkyl group having 5 to 12 carbon atoms, an aralkyl group having 7 to 12 carbon atoms or a phenyl group,
$R_3$ indicates a hydrogen atom or an alkyl group having 1 to 8 carbon atoms, and
X indicates a single bond, a sulfur atom or a divalent residue expressed by formula (3-1),

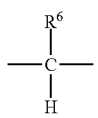

Formula (3-1)

in formula (3-1), $R^6$ indicates a hydrogen atom, an alkyl group having 1 to 8 carbon atoms or a cycloalkyl group having 5 to 12 carbon atoms, and in formula (3), A indicates an alkylene group having 2 to 8 carbon atoms or a divalent residue expressed by the formula (3-2),

Formula (3-2)

in formula (3-2), $R^7$ indicates a single bond or an alkylene group having 1 to 8 carbon atoms, and * indicates a bond to the oxygen atom side, and
in formula (3), Y and Z each indicates a hydroxyl group, an alkyl group having 1 to 8 carbon atoms, an alkoxyl group having 1 to 8 carbon atoms or an aralkyloxy group having 7 to 12 carbon atoms, and the other one indicates a hydrogen atom or an alkyl group having 1 to 8 carbon atoms, and
an addition amount of the weather resistance improver (B) is 0.1 parts by weight or more and 20 parts by weight or less, based on 1 parts by weight of the composite tungsten oxide fine particles (A).

2. The polycarbonate resin composition according to claim 1, wherein a dispersed particle size of the composite tungsten oxide fine particle (A) is 1 nm or more and 200 nm or less.

3. The polycarbonate resin composition according to claim 1, wherein the phosphite compound includes: 2,4,8,10-tetra-t-butyl-6-[3-(3-methyl-4-hydroxy-5-t-butylphenyl) propoxy] dibenzo [d, f][1,3,2] dioxaphosphepin, 2,10-dimethyl-4,8-di-t-butyl-6-[3-(3,5-di-t-butyl-4-hydroxyphenyl) propoxy]-12H-dibenzo [d, g][1,3,2] dioxaphosphocin, 2,4,8,10-tetra-t-butyl-6-[3-(3,5-di-t-butyl-4-hydroxyphenyl) propoxy] dibenzo [d, f][1,3,2] dioxaphosphepin, 2,4,8,10-tetra-t-pentyl-6-[3-(3,5-di-t-butyl-4-hydroxyphenyl) propoxy]-12-methyl-12H-dibenzo [d, g][1,3,2] dioxaphosphocin, 2,10-dimethyl-4,8-di-t-butyl-6-[3-(3,5-di-t-butyl-4-hydroxyphenyl) propionyloxy]-12H-dibenzo [d, g][1,3,2] dioxaphosphocin, 2,4,8,10-tetra-t-pentyl-6-[3-(3,5-di-t-butyl-4-hydroxyphenyl) propionyloxy]-12-methyl-12H-dibenzo [d, g][1,3,2] dioxaphosphocin, 2,4,8,10-tetra-t-butyl-6-[3-(3,5-di-t-butyl-4-hydroxyphenyl) propionyloxy]-dibenzo [d, f][1,3,2] dioxaphosphepin, 2,10-dimethyl-4,8-di-t-butyl-6-(3,5-di-t-butyl-4-hydroxybenzoyloxy)-12H-dibenzo [d, g][1,3,2] dioxaphosphocin, 2,4,8,10-tetra-t-butyl-6-(3,5-di-t-butyl-4-hydroxybenzoyloxy]-12-methyl-12H-dibenzo [d, g][1,3,2] dioxaphosphocin, 2,10-dimethyl-4,8-di-t-butyl-6-[3-(3-methyl-4-hydroxy-5-t-butylphenyl) propoxy]-12H-dibenzo [d, g][1, 3,2] dioxaphosphocin, 2,4,8,10-tetra-t-butyl-6-[3-(3,5-di-t-butyl-4-hydroxyphenyl) propoxy]-12H-dibenzo [d, g][1,3,2] dioxaphosphocin, 2,10-diethyl-4,8-di-t-butyl-6-[3-(3,5-di-t-butyl-4-hydroxyphenyl) propoxy]-12H-dibenzo [d, g][1,3,2] dioxaphosphocin, 2,4,8,10-tetra-t-butyl-6-[2,2-dimethyl-3-(3-t-butyl-4-hydroxy-5-methylphenyl) propoxy]-dibenzo [d, f][1,3,2] dioxaphosphepin.

4. The polycarbonate resin composition according to claim 1, wherein M element of the general formula $M_xWO_y$ showing the composite tungsten oxide fine particle (A) is one or more kinds selected from Cs and Rb.

5. The polycarbonate resin composition according to claim 1, wherein the composite tungsten oxide fine particle (A) has a hexagonal crystal structure.

6. A heat ray shielding molded body, which is a molded body of a melt-kneaded product of the polycarbonate resin composition of claim 1 with, polycarbonate resin (C) or, a different kind of thermoplastic resin compatible with the polycarbonate resin (C).

7. A heat ray shielding lamination body, wherein the heat ray shielding molded body of claim 6 is laminated on other transparent molded body.

\* \* \* \* \*